US011787382B2

(12) United States Patent  
Michel et al.

(10) Patent No.: US 11,787,382 B2  
(45) Date of Patent: Oct. 17, 2023

(54) SYSTEMS AND METHODS FOR MONITORING BRAKE SYSTEMS ON RAILWAY ASSETS

(71) Applicant: Amsted Rail Company, Inc., Chicago, IL (US)

(72) Inventors: Mark Michel, Columbia, SC (US); Peter Novellino, Fountain Inn, SC (US)

(73) Assignee: AMSTED RAIL COMPANY, INC., Chicago, IL (US)

( * ) Notice: Subject to any disclaimer, the term of this patent is extended or adjusted under 35 U.S.C. 154(b) by 531 days.

(21) Appl. No.: 16/999,555

(22) Filed: Aug. 21, 2020

(65) Prior Publication Data

US 2021/0053548 A1    Feb. 25, 2021

Related U.S. Application Data

(60) Provisional application No. 62/889,803, filed on Aug. 21, 2019.

(51) Int. Cl.
| | |
|---|---|
| *B60T 17/22* | (2006.01) |
| *B60T 13/66* | (2006.01) |
| *B60T 8/17* | (2006.01) |
| *B61K 7/04* | (2006.01) |

(52) U.S. Cl.  
CPC .......... *B60T 17/228* (2013.01); *B60T 8/1705* (2013.01); *B60T 13/665* (2013.01); *B61K 7/04* (2013.01)

(58) Field of Classification Search  
CPC .... B60T 17/228; B60T 8/1705; B60T 13/665; B61K 7/04; B61G 5/00; B61L 15/0081  
See application file for complete search history.

(56) References Cited

U.S. PATENT DOCUMENTS

| | | | |
|---|---|---|---|
| 5,410,911 A | 5/1995 | Severinsson | |
| 6,006,868 A | 12/1999 | Klink | |
| 7,705,743 B2 | 4/2010 | Barone et al. | |
| 2010/0262321 A1* | 10/2010 | Daum | B61L 15/009 |
| | | | 701/19 |
| 2012/0046811 A1 | 2/2012 | Murphy et al. | |
| 2012/0205200 A1* | 8/2012 | Gregar | G01N 3/08 |
| | | | 188/1.11 R |
| 2014/0027570 A1 | 1/2014 | Tilman | |
| 2016/0272228 A1* | 9/2016 | LeFebvre | B61L 17/00 |

FOREIGN PATENT DOCUMENTS

CN    203629738 U    6/2014

OTHER PUBLICATIONS

International Search Report issued in PCT/US2020/047425 dated Oct. 4, 2020.

* cited by examiner

*Primary Examiner* — Russell Frejd  
(74) *Attorney, Agent, or Firm* — Fox Rothschild LLP; Carlson Thorstad-Forsyth

(57) ABSTRACT

Systems for monitoring brake systems on railway assets include a load measuring device. The load measuring device includes an instrumented coupling configured to be connected to the rigging of a brake system of the railway asset; and to an underframe of the railway asset. The load measuring device also includes a data collection unit configured to process an output of a sensor of the instrumented coupling and, based on the sensor output, determine the force being transmitted between the brake rigging and the underframe.

63 Claims, 15 Drawing Sheets

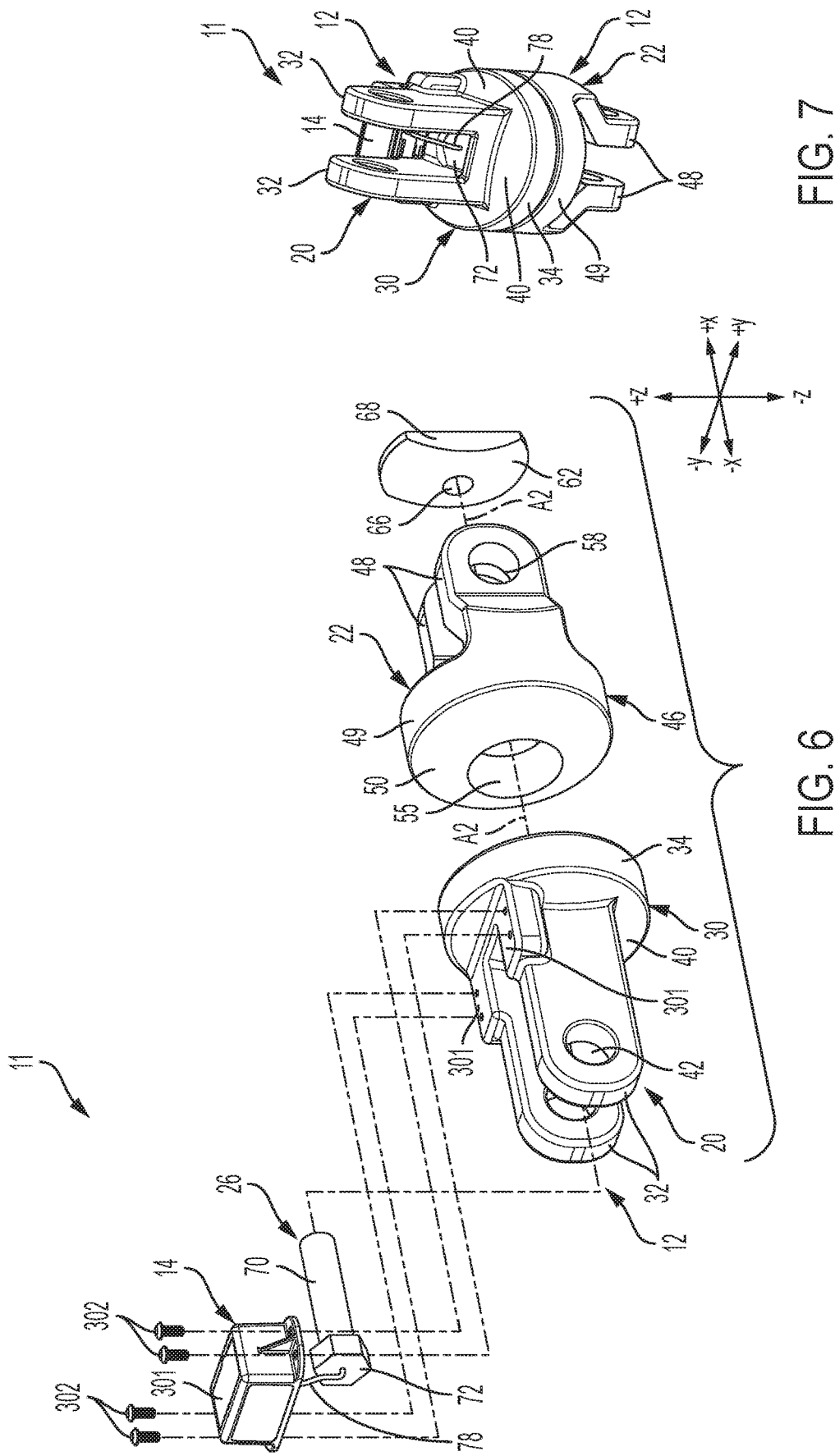

SYSTEMS AND METHODS FOR MONITORING BRAKE SYSTEMS ON RAILWAY ASSETS

CROSS-REFERENCE TO RELATED APPLICATIONS

This application claims the benefit of U.S. provisional application No. 62/889,803, filed Aug. 21, 2019, the contents of which are incorporated by reference herein in their entirety. The contents of U.S. application Ser. No. 16/510,838, filed Jul. 12, 2019, are incorporated by reference herein in their entirety.

BACKGROUND

The present document generally relates to railway asset management systems. More particularly, the present solution relates to implementing systems and methods for monitoring the brake system of a railway asset when the railway asset is associated to a data collection unit and/or a Wireless Sensor Node(s) ("WSN(s)"). A railway asset may include, for example, railcars, locomotives, and/or rail maintenance equipment.

In railcar transport systems, various data collection units are coupled to railcars. The data collection units are communicatively coupled to each other via the Internet, and therefore are collectively referred to as an Internet of Things ("IoT").

A railcar brake system will be described herein. Railcars typically include a brake system having brake shoes mounted on an articulating rigging. The rigging is anchored to an underframe of the railcar in a manner that permits the rigging to move in relation to the underframe in response to an actuation force. The actuation force can be provided by a brake cylinder. The brake cylinder is actuated by pressurized air directed to the cylinder by a brake valve located on the railcar. The resulting movement of the rigging moves each of the brake shoes into contact with the outer tread of a corresponding wheel of the railcar. The resulting friction between the brake shoes and the wheels produces a braking force on the wheels.

Due to the critical importance of effective braking, a typical railcar is subject to periodic inspections to ensure that its brake system is in proper working order. For example, federal regulations require a "Class 1A" inspection of railcar brake systems after every 1,000 miles of travel. As part of the Class 1A inspection, the brake system must be actuated while a visual check is made to ensure that all of the moving parts of the system are working properly. This inspection process requires that the railcar be taken out of service temporarily, resulting in lost revenue and possible scheduling delays. Also, the need to inspect hundreds of railcars on a periodic basis can result in a substantial expenditure of manpower and other resources by a railway system.

The need for time-consuming and labor-intensive inspections of railcar brake systems can be reduced by obtaining diagnostic brake-force measurements during normal operational service of the railcars. Brake-force measurements also can be used to provide an indication of whether the manually-actuated hand brake of a railcar is, or is not engaged. Such information is important because moving a railcar with the hand brake engaged can result in damage to the wheels and their associated brake shoes; and failing to engage the hand brake when the railcar is parked can result in unintended and potentially dangerous movement of the railcar.

Brake-force measurements can be difficult to obtain, however, due to the need for the brake rigging to articulate in relation to its anchoring point on the underframe. In particular, the portion of the rigging that is coupled to the anchoring point typically pivots about three orthogonal axes in relation to the anchoring point as braking force is applied to and removed from the rigging. Thus, positioning a conventional load cell in the load chain between the articulating rigging and the non-articulating underframe will subject the load cell to non-axial loading that likely will result in premature failure of the load cell.

SUMMARY

The present disclosure generally relates to systems and methods for monitoring brake systems on railway assets. In one aspect, the disclosed technology relates to a load measuring device for use on a railway asset. The railway asset has an underframe, a plurality of wheels coupled to and configured to rotate in relation to the underframe, and a brake system. The brake system has a rigging configured to apply a braking force to one or more of the wheels The load measuring device includes an instrumented coupling. The instrumented coupling has a first member configured to be connected to the rigging of the brake system; a second member configured to be connected to the underframe; a fastener configured to connect the first member to the second member, and to transmit a force between the first and second members; and a sensor attached to the fastener and configured to generate an output relating to the force transmitted between the first and second members.

In another aspect of the disclosed technology, the first member and the second member are rigid.

In another aspect of the disclosed technology, the sensor includes a strain sensor.

In another aspect of the disclosed technology, the fastener includes a bolt; and the strain sensor includes a strain gauge fixed to the bolt.

In another aspect of the disclosed technology, the first member is configured to rotate in relation to the second member so that a sensing axis of the sensor remains substantially aligned with a direction in which an external force is applied to the load measuring device.

In another aspect of the disclosed technology, the first member is configured to rotate in relation to the second member about three orthogonal axes, one of the orthogonal axes being coincident with the sensing axis of the sensor.

In another aspect of the disclosed technology, the first member has a body, and two arms extending from the body and configured to be connected to the rigging of the brake system; and the second member has a body, and two arms extending from the body of the second member and configured to be connected to the underframe.

In another aspect of the disclosed technology, the body of the first member has a first passage formed therein; the body of the second member has a second passage formed therein; the fastener includes a bolt; and the first and second passages are configured to receive the bolt.

In another aspect of the disclosed technology, the body of the first member has a rounded outer surface; the body of the second member includes a rounded outer surface having a curvature substantially matching a curvature of the rounded outer surface of the first member; and the rounded outer surface of the first member is configured to slidably engage the rounded outer surface of the second member when the first member is connected to the second member.

In another aspect of the disclosed technology, the rounded outer surfaces of the bodies of the first and second members are spherical segments.

In another aspect of the disclosed technology, one of the rounded outer surfaces of the first and second members is rounded inwardly; and the other rounded outer surface of the first and second members is rounded outwardly.

In another aspect of the disclosed technology, one of the first and the second passages has a first end, and a second end having a diameter greater than a diameter of the first end; the bolt includes a head and an adjoining shank; and the other of the first and second passages has a first portion configured to receive the head of the bolt, and a second portion having a diameter approximately equal to an outer diameter of a shank of the bolt.

In another aspect of the disclosed technology, the first portion of the other of the first and second passages has a perimeter having a shape that approximately matches a shape the head of the bolt so that contact between the head of the bolt and the perimeter of the other of the first and second passages prevents rotation of the bolt.

In another aspect of the disclosed technology, the head of the bolt has a substantially hexagonal shape.

In another aspect of the disclosed technology, the body of the first or the second member has a raised lip adjacent to an entrance of the other of the first and second passages.

In another aspect of the disclosed technology, the fastener further incudes a nut having an outwardly-rounded outer surface; the body of at least one of the first and the second members has an inwardly-rounded surface having a curvature substantially matching a curvature of the outwardly-rounded surface of the fastener; and the outwardly-rounded outer surface of the nut is configured to slidably engage the inwardly-rounded outer surface of the first or the second member when the first member is connected to the second member.

In another aspect of the disclosed technology, the outwardly-rounded outer surface of the nut and the inwardly-rounded outer surface of the body of the at least one of the first and second members are spherical segments.

In another aspect of the disclosed technology, the nut further includes a first and a second substantially planar side surface; and the body of the at least one of the first and second members further includes a first and a second substantially planar surface configured to contact the respective first and second substantially planar surfaces of the nut to thereby prevent rotation of the nut in relation to the at least one of the first and the second members.

In another aspect of the disclosed technology, the load measuring device further includes a data collection unit mounted on one of the first and second members and communicatively coupled to the sensor.

In another aspect of the disclosed technology, the data collection unit includes a sensor node; and the sensor node includes a processor; a memory communicatively coupled to the processor; and computer-executable instructions stored on the memory. The computer-executable instructions, when executed by the processor, cause the processor to calculate the force transmitted between the first and second members based on the output of the sensor.

In another aspect of the disclosed technology, the sensor node further includes a transceiver communicatively coupled to the processor and configured to transmit a signal representative of the calculated force transmitted between the first and second members.

In another aspect of the disclosed technology, the computer-executable instructions, when executed by the processor, cause the processor to store the calculated force transmitted between the first and second members.

In another aspect of the disclosed technology, the computer-executable instructions, when executed by the processor, cause the processor to compare the calculated force transmitted between the first and second members to a predetermined baseline value for the calculated force transmitted between the first and second members.

In another aspect of the disclosed technology, the computer-executable instructions, when executed by the processor, cause the processor to sample the output of the sensor node at predetermined intervals.

In another aspect of the disclosed technology, the computer-executable instructions, when executed by the processor, cause the processor to infer the braking force based on the calculated force transmitted between the first and second members.

In another aspect of the disclosed technology, the force transmitted between the first and second members is proportional to the braking force; and the output of the sensor is proportional to the force transmitted between the first and second members.

In another aspect of the disclosed technology, a railway asset includes an underframe; a plurality of wheels coupled to and configured to rotate in relation to the underframe; a brake system comprising a rigging configured to apply a braking force to one or more of the wheels; a bracket mounted on the underframe and configured to provide an anchoring point for the rigging; and a load measuring device comprising an instrumented coupling.

The instrumented coupling includes a first member connected to the rigging of the brake system; a second member connected to the bracket; a fastener configured to connect the first member to the second member, and to transmit between the first and second members a force reactive to the braking force; and a sensor attached to the fastener and configured to generate an output relating to the reactive force.

In another aspect of the disclosed technology, the first member and the second member are rigid.

In another aspect of the disclosed technology, the sensor includes a strain sensor.

In another aspect of the disclosed technology, the fastener includes a bolt; and the strain sensor includes a strain gauge fixed to the bolt.

In another aspect of the disclosed technology, the fastener includes a bolt; and the sensor includes a strain gauge fixed to the bolt.

In another aspect of the disclosed technology, the first member and the second member are rigid.

In another aspect of the disclosed technology, the first member is configured to rotate in relation to the second member so that a sensing axis of the sensor remains substantially aligned with a direction in which the reactive force is applied to the instrumented coupling.

In another aspect of the disclosed technology, the first member includes a body, and two arms extending from the body and connected to the rigging of the brake system; and the second member includes a body, and two arms extending from the body of the second member and connected to the bracket.

In another aspect of the disclosed technology, the body of the first member has a first passage formed therein; the body of the second member has a second passage formed therein; the fastener includes a bolt; and the first and second passages are configured to receive the bolt.

In another aspect of the disclosed technology, the body of the first member has a rounded outer surface; the body of the second member has a rounded outer surface having a curvature substantially matching a curvature of the rounded outer surface of the first member; and the rounded outer surface of the first member is configured to slidably engage the rounded outer surface of the second member when the first member is connected to the second member.

In another aspect of the disclosed technology, the rounded outer surfaces of the bodies of the first and second members are spherical segments.

In another aspect of the disclosed technology, one of the rounded outer surfaces of the first and second members is rounded inwardly; and the other rounded outer surface of the first and second members is rounded outwardly.

In another aspect of the disclosed technology, one of the first and the second passages has a first end, and a second end having a diameter greater than a diameter of the first end; the bolt has a head and an adjoining shank; and the other of the first and second passages has a first portion configured to receive a head of the bolt, and a second portion having a diameter approximately equal to an outer diameter of a shank of the bolt.

In another aspect of the disclosed technology, the first portion of the other of the first and second passages has a perimeter having a shape that approximately matches a shape the head of the bolt so that contact between the head of the bolt and the perimeter of the other of the first and second passages prevents rotation of the bolt.

In another aspect of the disclosed technology, the head of the bolt has a substantially hexagonal shape.

In another aspect of the disclosed technology, the body of the first or the second member has a raised lip adjacent to an entrance of the other of the first and second passages.

In another aspect of the disclosed technology, the fastener further includes a nut having an outwardly-rounded outer surface; the body of at least one of the first and the second members has an inwardly-rounded surface having a curvature substantially matching a curvature of the outwardly-rounded surface of the fastener; and the outwardly-rounded outer surface of the nut is configured to slidably engage the inwardly-rounded outer surface of the first or the second member when the first member is connected to the second member.

In another aspect of the disclosed technology, the outwardly-rounded outer surface of the nut and the inwardly-rounded outer surface of the body of the at least one of the first and second members are spherical segments.

In another aspect of the disclosed technology, the nut further includes a first and a second substantially planar side surface; and the body of the at least one of the first and second members further includes a first and a second substantially planar surface configured to contact the respective first and second substantially planar surfaces of the nut to thereby prevent rotation of the nut in relation to the at least one of the first and the second members.

In another aspect of the disclosed technology, the load measuring device further includes a data collection unit mounted on one of the first and second members and communicatively coupled to the sensor.

In another aspect of the disclosed technology, the data collection unit includes a sensor node. The sensor node includes a processor; a memory communicatively coupled to the processor; and computer-executable instructions stored on the memory. The computer-executable instructions, when executed by the processor, cause the processor to calculate the force transmitted between the first and second members based on the output of the sensor.

In another aspect of the disclosed technology, the sensor node further includes a transceiver communicatively coupled to the processor and configured to transmit a signal representative of the calculated force transmitted between the first and second members.

In another aspect of the disclosed technology, the computer-executable instructions, when executed by the processor, cause the processor to store the calculated force transmitted between the first and second members.

In another aspect of the disclosed technology, the computer-executable instructions, when executed by the processor, cause the processor to compare the calculated force transmitted between the first and second members to a predetermined baseline value for the calculated force transmitted between the first and second members.

In another aspect of the disclosed technology, the computer-executable instructions, when executed by the processor, cause the processor to sample the output of the sensor at predetermined intervals.

In another aspect of the disclosed technology, a method is provided for determining the status of a brake system of a railway asset. The railway asset includes an underframe, and a plurality of wheels coupled to and configured to rotate in relation to the underframe. The brake system has a rigging configured to apply a braking force to one or more of the wheels.

The method includes providing a load measuring device having an instrumented coupling and a data collection unit. The instrumented coupling includes a first member and a second member. The instrumented coupling also includes a fastener configured to connect the first member to the second member, and to transmit a force between the first and second members. The instrumented coupling further includes a sensor mounted on the fastener, communicatively coupled to the data collection unit, and configured to generate an output relating to the force transmitted between the first and second members.

The method further includes connecting the first member to the rigging of the brake system; connecting the second member to an anchoring point for the rigging, the anchoring point being located on the underframe of the rail asset; and based on an output of the sensor, determining a reactive force exerted on the device in response to the application of the braking force using the data collection unit.

In another aspect of the disclosed technology, the method further includes comparing the reactive force to a predetermined baseline value for the reactive force using the data collection unit.

In another aspect of the disclosed technology, the method further includes inferring a braking force exerted by the brake system from the reactive force using the data collection unit.

In another aspect of the disclosed technology, the method further incudes providing a second load measuring device, and connecting a first member of the second load measuring device to the rigging of the brake system. The method also includes connecting a second member of the second load measuring device to a second anchoring point for the rigging, the second anchoring point being located on the underframe of the railway asset. The method further includes determining a reactive force exerted on the second load measuring device in response to the application of the braking force, based on an output of a sensor of the second load measuring device.

In another aspect of the disclosed technology, a brake system for a railway asset includes a brake rigging configured to be mounted on, and to articulate in relation to an underframe of the railway asset. The brake system also includes a plurality of brake pads mounted on the brake rigging and each being configured to generate a braking force when contacting a respective wheel of the railway asset. The brake system further includes a brake cylinder coupled to the brake rigging and configured to move the brake rigging so that the brake rigging urges the brake pads into contact with the respective wheels; and a brake valve configured to provide pressurized air to the brake cylinder to actuate the brake cylinder.

The brake system also includes a load measuring device having an instrumented coupling and a data collection unit. The instrumented coupling has a first member configured to be connected to the brake rigging; a second member configured to be connected to the underframe; and a fastener configured to connect the first member to the second member, and to transmit a force between the first and second members. The instrumented coupling also includes a sensor attached to the fastener, communicatively coupled to the data collection unit, and configured to generate an output relating to the force transmitted between the first and second members.

In another aspect of the disclosed technology, the load measuring device is a first load measuring device, and the system further includes a second load measuring device. The first load measuring device is configured to be coupled to a first point on the brake rigging, and the second load measuring device is configured to be coupled to a second point on the brake rigging.

In another aspect of the disclosed technology, a system for monitoring a brake system of a railway asset includes a load measuring device.

In another aspect of the disclosed technology, the load measuring device includes a data collection unit mounted on one of the first and second members and communicatively coupled to the sensor. The data collection unit includes a processor; a memory communicatively coupled to the processor; and computer-executable instructions stored on the memory. The computer-executable instructions, when executed by the processor, cause the processor to calculate the force transmitted between the first and second members based on the output of the sensor.

In another aspect of the disclosed technology, the data collection unit of the load measuring device is a first data collection unit, and the system further includes a second data collection unit communicatively coupled to the sensor node and mounted on the railway asset.

In another aspect of the disclosed technology, the second data collection unit includes a communication management unit.

In another aspect of the disclosed technology, the system further includes a powered wireless gateway communicatively coupled to the communication management unit.

In another aspect of the disclosed technology, the system further includes a second load measuring device communicatively coupled to the second data collection unit.

In another aspect of the disclosed technology, the first data collection unit includes a transceiver communicatively coupled to the processor and configured to transmit the calculated force to the data collection unit.

In another aspect of the disclosed technology, the second data collection unit is configured to consolidate data from the load measuring devices and/or to apply logic to the data to generate messages and warning alerts to a host.

BRIEF DESCRIPTION OF THE DRAWINGS

The following drawings are illustrative of particular embodiments of the present disclosure and do not limit the scope of the present disclosure. The drawings are not to scale and are intended for use in conjunction with the explanations in the following detailed description. Various non-limiting embodiments will be described in detail with reference to the drawings, wherein like reference numerals represent like parts and assemblies throughout the several views.

FIG. 6 is a top-rear exploded view of the load measuring device shown in FIGS. 1-5.

FIG. 7 is a bottom-rear view of the load measuring device shown in FIGS. 1-6.

DETAILED DESCRIPTION

Figure 10:
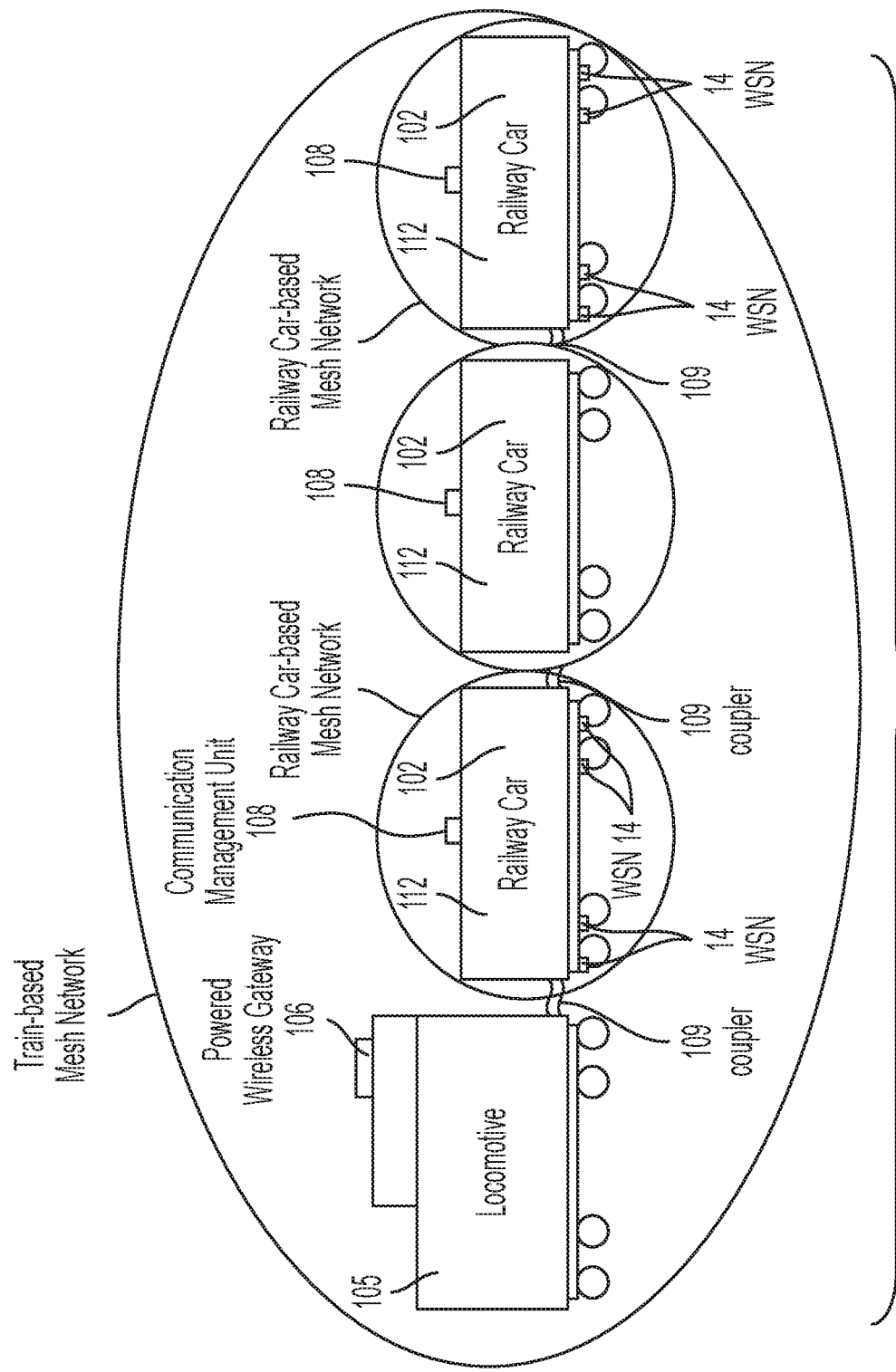
FIG. 10 is a diagrammatic illustration of a train incorporating the brake monitoring system referenced in the description of FIG. 1.

The figures depict a brake monitoring system, and various components thereof. The system is configured to be incorporated into a brake system 100 (see FIG. 16) of an individual railway asset 102 such as a railcar of a train consist 104 (see FIG. 10). As shown in FIG. 10, the train consist 104 includes a connected group of railcars 102 and one or more locomotives 105. The railcars 102 and the locomotive 105 are coupled to each other by way of rail couplers 109. The use of the system in connection with a railway asset 102 such as the railcar 102 within a train consist 104 is described for illustrative purposes only. The system also can be used to evaluate the brake systems 100 of railcars 102 that are not part of a train consist 104, such as railcars 102 that are parked in a railyard.

The brake monitoring system can provide an indication of whether the brake system 100 is capable of applying braking force to the wheels 103 of the railcar 102; and the inferred magnitude of the applied braking force. The brake monitoring system determines the status of the brake system 100 by monitoring the mechanical loading within the brake system 100. The brake monitoring system can communicate the status of the brake system 100 to, for example, a data collection unit, and/or to a remote server off of train consist 104. A data collection unit can include, but is not limited to, a sensor, a powered wireless gateway ("PWG") 106 located on the locomotive 105 of the train consist 104; a PWG 106 located in a railyard; and a communication management device ("CMU") 108 located on the railcar 102.

Figure 15:
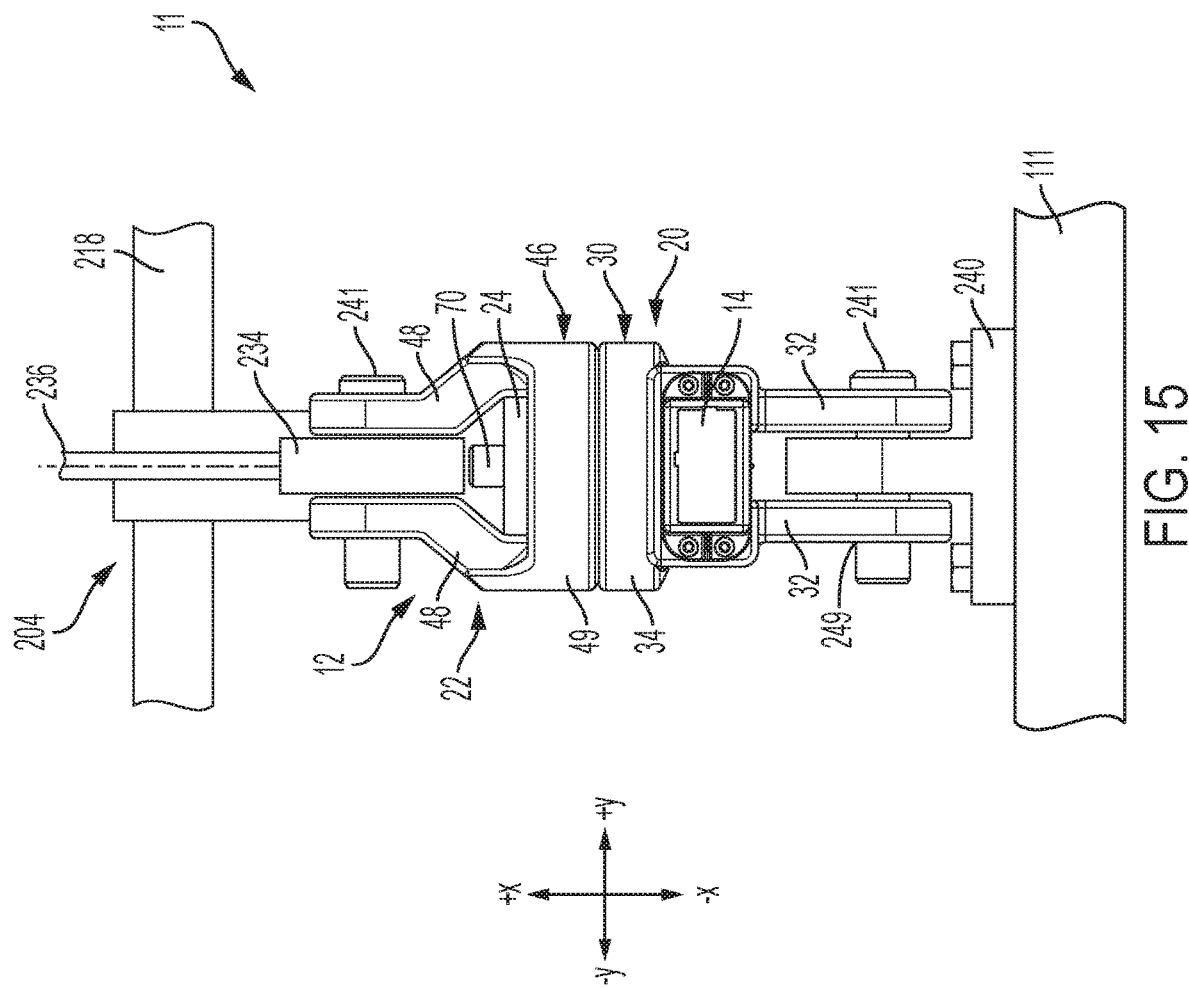
FIG. 15 is a magnified top view of the area designated "B" in FIG. 14.

The brake monitoring system comprises first and second load measuring devices 11 that provide an indication of the load applied to the brakes by brake rigging 204. The load measuring devices 11 are identical; and unless otherwise noted, references to a single load measuring device 11 apply equally to both of the load measuring devices 11. As shown in FIG. 15, each load measuring device 11 is mounted between, and mechanically connects the articulating rigging 204 of the brake system 100 with a non-articulating underframe 111 of the railcar 102. This arrangement subjects the load measuring device 11 to a mechanical load whenever the brake system 100 applies braking force to the wheels 103 of the railcar 102. The load measuring device 11 generates an electrical signal representative of the mechanical load on the load measuring device 11, thereby providing an indication of whether the brake system 100 is generating a braking force on the railcar 102, and the magnitude of the braking force.

Referring to FIGS. 1-9, each load measuring device 11 includes an instrumented coupling 12, and a data collection unit, such as a sensor module 14 mounted on, and physically connected to the coupling 12. The sensor module can be, for example, a WSN 14. The WSN 14 is communicatively coupled to, and receives the output of a load sensor 74 positioned on the coupling 12. The WSN 14 determines the mechanical load on the coupling 12 based on the output of the load sensor 74. The WSN 14 can send this information to, for example: a communication device such as a CMU 108 mounted on the railcar 102; a PWG 106 located on the locomotive 105; a PWG 106 located in a railyard; or a remote server. For example, the CMU 108 can relay the information to the PWG 106 located on the locomotive 105. The information can be processed and analyzed to assess the condition of the brake system 100.

Communication Management Unit

Each CMU 108 can comprise a processor; a power source such as a battery, energy harvester, or internal power-generating capability; a global navigation satellite system (GNSS) device such as a global positioning system ("GPS") receiver, Wi-Fi, satellite, and/or cellular capability; a wireless communications capability for maintaining the railway-car-based network; a wireless communication capability for communicating with the train-based network; and optionally, one or more sensors, including, but not limited to, an accelerometer, gyroscope, proximity sensor or temperature sensor. Although GPS is used in the embodiments described herein, any type of GNSS system or devices can be used in alternative embodiments. For example, GLOMUS and Bei-Dou can be used in lieu of GPS; and other types of GNSS are in development.

The CMU 108 communicates with the WSNs 14 within its associated railway-car-based network using open standard protocols, such as the IEEE 2.4 GHz 802.15.4, Bluetooth LE, or Bluetooth Mesh radio standards. As noted above, the CMU 108 also forms part of the train-based network, which includes all of the CMUs 108 in the train consist 104; and the PWG 106, which controls the CMUs 108.

Each CMU 108 performs the following functions: managing the low-power railway-car-based network overlaid on its associated railcar 102; consolidating data from one or more WSNs 14 in the network and applying logic to the data to generate messages and warning alerts to a host such as the locomotive or a remote railroad operations center; supporting built-in sensors, such as an accelerometer, within the CMU 108 to monitor specific attributes of the railcar 102 such as location, speed, and accelerations, and to provide an analysis of this information to generate alerts; and supporting bi-directional communications upstream to the host or control point, such as the locomotive 108 and/or an off-train, remote railroad operations center; and downstream to its associated WSNs 14 on the railcar 102.

The CMUs 108 can communicate with the PWG 106 on a wireless basis. Alternatively, the CMUs 108 can be configured to communicate through a wired connection, such as through the electronically controlled pneumatic (ECP) brake system of the train consist 104. Each CMU 108 is capable of receiving data and/or alarms from its associated WSNs 14; drawing inferences from the data or alarms regarding the performance of the railcar 102 and its braking system 100; and transmitting the data and alarm information to the PWG 106 or other remote receiver. The CMU 108 can be a single unit. In addition to communicating with, controlling, and monitoring the WSNs 14 in the local railway-car-based network 105, the CMU 108 has the capability of processing the data it receives from the WSN's 14. The CMU 108 also serves as a communications link to other locations, such as the PWG 106. The CMUs 108 optionally can be configured with off-train communication capabilities similar to those of the PWG 106, to allow the CMUs 108 to communicate with devices off of the train consist 104, such as a server located at a remote railroad operations center.

Powered Wireless Gateway

The PWG 106 is located on the locomotive 108. Alternatively, the PWG 106 can be positioned at other locations on the train consist 104, preferably where a source of external power is available; or in a railyard. The PWG 106 manages a train-based network overlaid on the train consist 104, and communicates directly with each of the CMUs 108 on the various railcars 102 in the train consist 104. The PWG 106, the CMUs 108, and WSNs 14 make up the train-based network.

The PWG 106 controls the train-based network overlaid on the train consist 104. The PWG 106 can include a processor; a GPS or other type of GNSS device; one or more sensors, including but not limited to an accelerometer, a gyroscope, a proximity sensor, and a temperature sensor; a satellite and or cellular communication system; a local wireless transceiver, e.g. WiFi; an Ethernet port; a high capacity network manager; and other means of communication. The PWG 106 can receive electrical power from a powered asset in the train consist 104, such as the locomotive 108. Alternatively, or in addition, the PWG 106 can receive power from another source, such as a solar-power generator or a high-capacity battery. Also, the PWG 106 can be configured to perform the logical operations The components and configuration of the PWG 106 are similar to those of the CMUs 108, with the exception that the PWG 106 typically draws power from an external source, while the CMUs 108 typically are powered internally. Also, the PWG 106 collects data and draws inferences regarding the overall performance of the train consist 104 and the train-based network. The CMUs 108, by contrast, collect data and draw inferences regarding the performance of individual railcars 102 and their associated railway-car-based network 105. Also, the PWG 106 is a computing device that includes a processor; and a computer-readable storage medium comprising one or more programming instructions that, when executed by the processor, cause the PWG 106 to perform the various logical functions associated with the brake monitoring system and described below. Alternatively, these logical functions can be performed by another computing device, such as a specially modified CMU 108 or WSN 14; or by a central server located at a remote location such as a railroad operations center.

Railway Asset

The present technology can apply to any railway asset 102 using similar systems for braking, and can include any railcar 102 such as a box car. This description of the railcar 102 is provided solely as an illustrative example of a railway asset with which the brake monitoring system can be used, and the terms "railway asset" and "railcar" are used interchangeably herein. The brake monitoring system can be used in railway assets having other configurations, including railcars in the form of hopper cars; flatcars; gondolas; coal cars; tank cars; etc.

Figure 11:
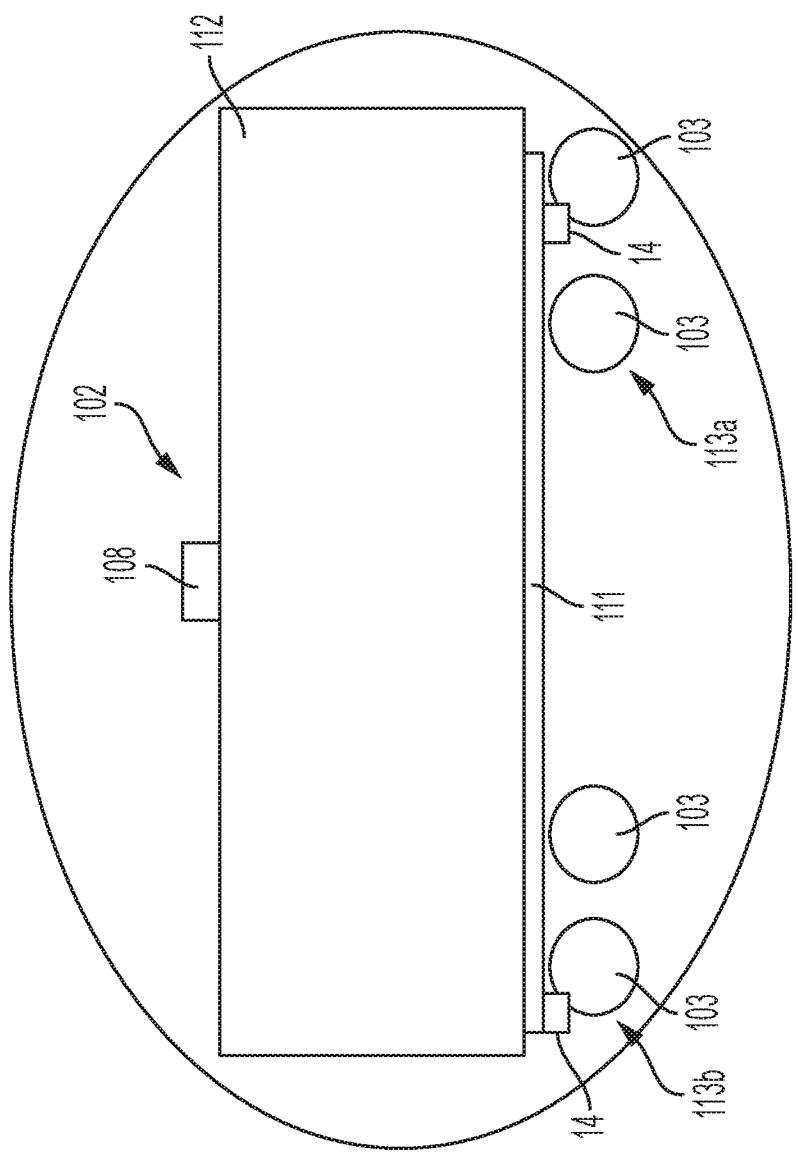
FIG. 11 is a diagrammatic illustration of a railcar of the train shown in FIG. 10.

As illustrated in FIG. 11, the railcar 102 comprises an underframe 111; a box 112 mounted on the underframe 111; and a first and a second truck 113a, 113b each coupled the underframe 111. The first truck 113a is located proximate a first end of the railcar 102; and the second truck 113b is located proximate a second end of the railcar 102. Each truck 113a, 113b can rotate in relation to the underframe 111 about a vertically-oriented central axis of the truck 113a, 113b, to facilitate transit of the railcar 102 over curved sections of track.

Figure 12:
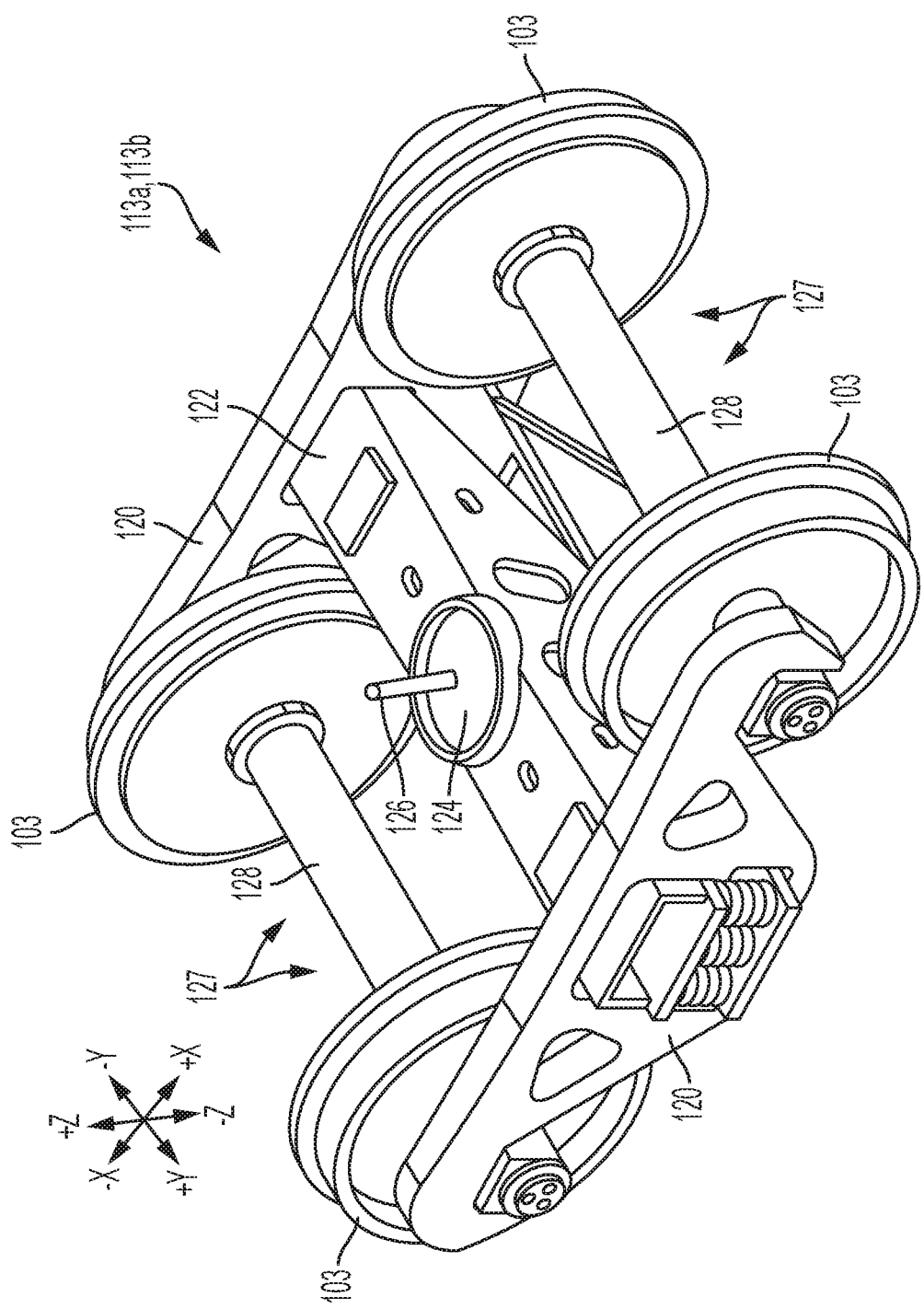
FIG. 12 is a top-front perspective view of a truck of the railcar shown in FIG. 11.

Referring to FIG. 12, each truck 113a, 113b includes two side frames 120; a bolster 122 located between and connected to the side frames 120; a center plate 124 mounted on the bolster 122; and a center pin 126 secured to the bolster 122 and extending through the center plate 124. Each truck 113a, 113b is coupled to the underframe 111 of the railcar 102 by way of the center pin 126, and rotates in relation to the underframe 111 about the center pin 126. The underframe 111 and the box 112 are supported on the trucks 113a, 113b by way of the center plates 124, each of which engages, and rotates in relation to a center sill on the underframe 111.

Each of the trucks 113a, 113b also includes two wheel assemblies 127. The wheel assemblies 127 each include an axle 128, and two of the wheels 103 mounted on opposite ends of the axle 128. The axles 128 are coupled to, and rotate in relation to the side frames 120 by way of journal bearings (not shown).

Brake System

The brake system 100 can be configured as follows. This description of the brake system 100 is provided solely as an illustrative example of a brake system into which the brake monitoring system can be incorporated. The brake monitoring system can be incorporated into brake systems having other configurations.

Figure 13:
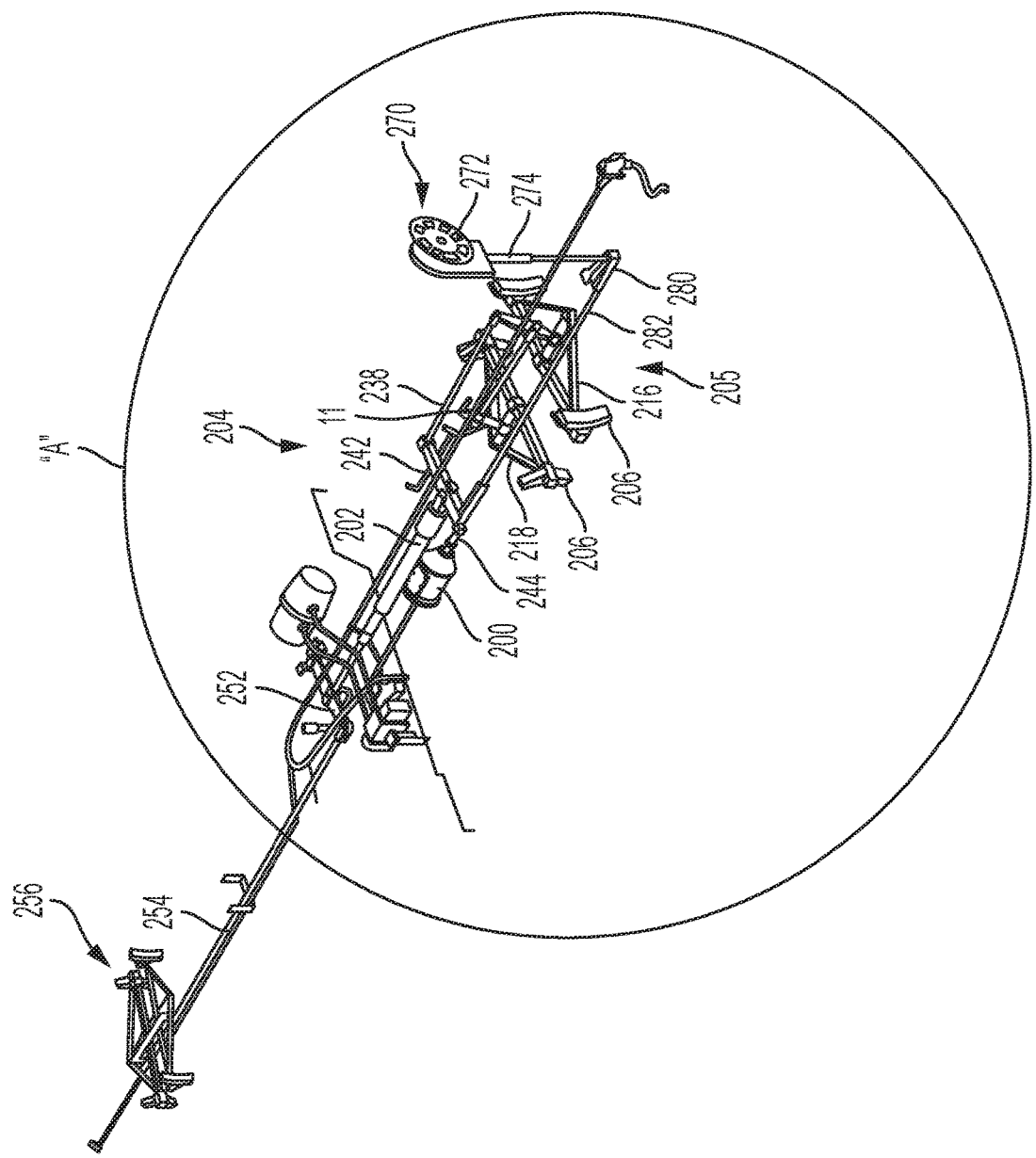
FIG. 13 is a top-front perspective view of brake rigging of the railcar shown in FIG. 11.
Figure 14:
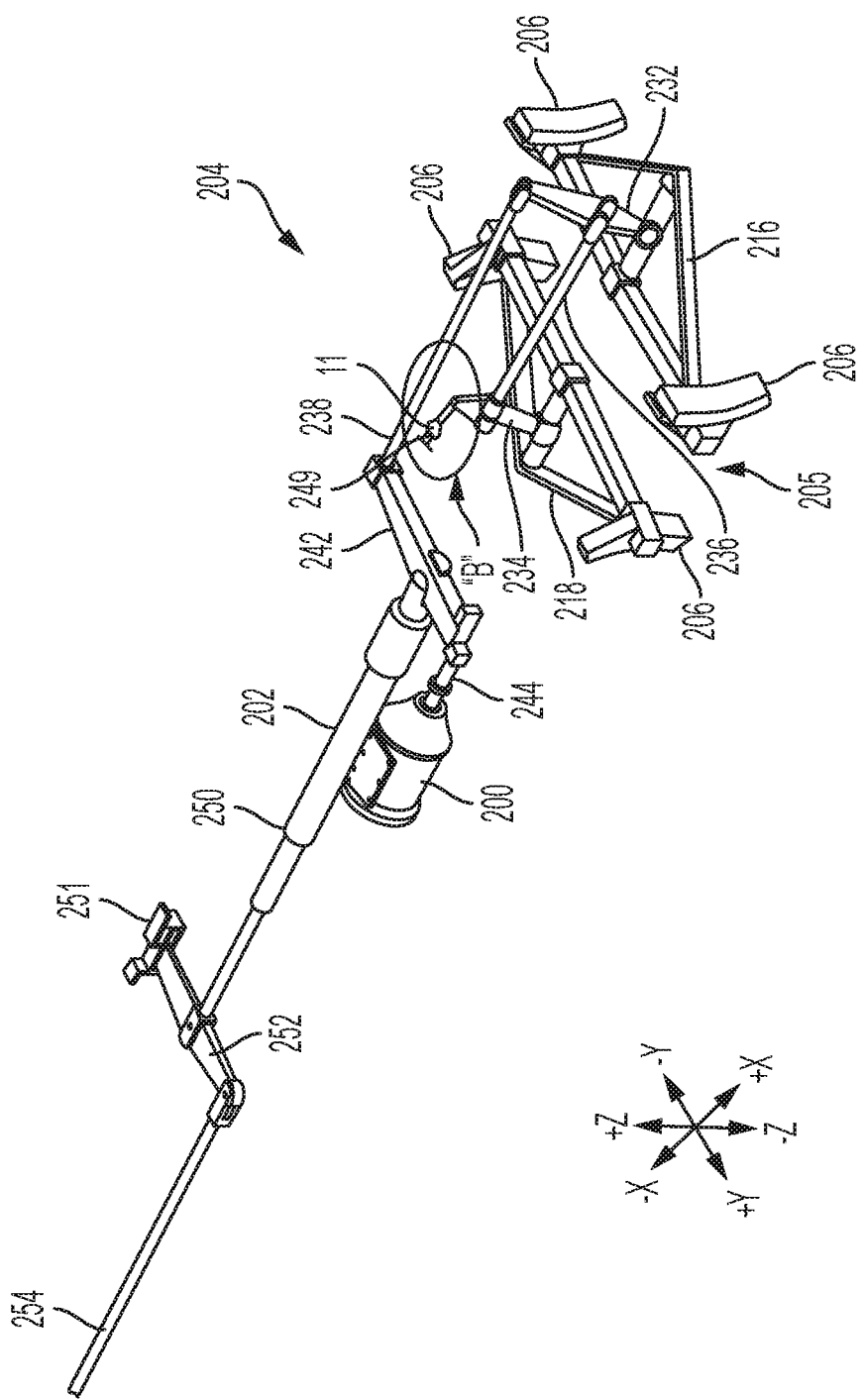
FIG. 14 is a magnified view of the area designated "A" in FIG. 13.
Figure 16:
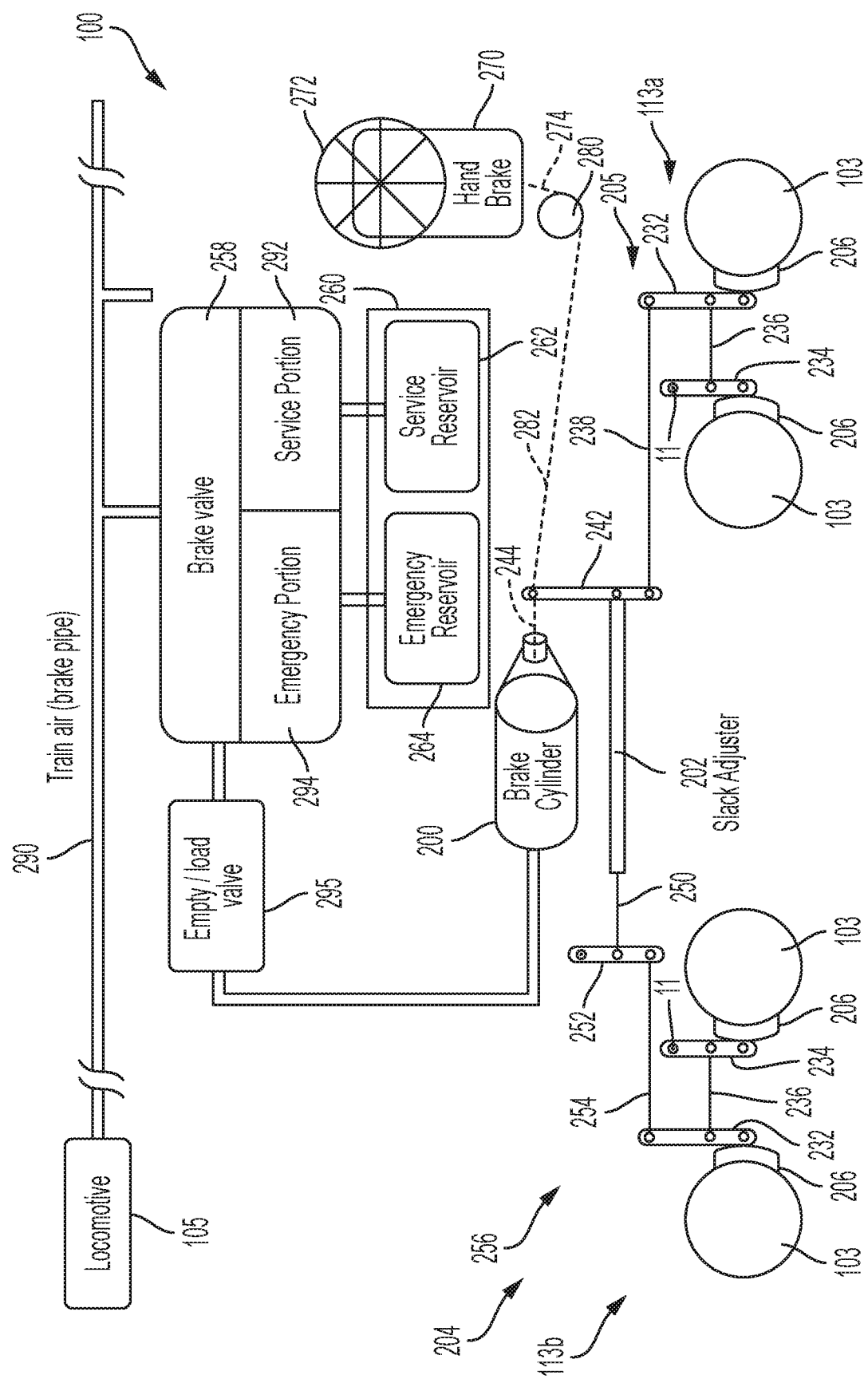
FIG. 16 is a schematic illustration of a brake system of the railcar shown in FIG. 11.

Referring to FIGS. 13, 14, and 16, the brake system 100 includes a pneumatic brake cylinder 200, a slack adjuster 202, the rigging 204, and eight brake shoes 206. Each brake shoe 206 is connected to the rigging 204, and is positioned proximate to a respective one of the wheels 103. The rigging 204 articulates in a manner that urges each brake shoe 206 into and out of contact with an outer tread of its associated wheel 103. Contact between the brake shoe 206 and the wheel 103 results in friction that produces a braking force on the wheel 103.

The rigging 204 incudes a first rigging subassembly 205 for the first truck 113a of the rail car 102, visible in detail in FIG. 14, and a second rigging subassembly 256 for the second truck 113b. The subassembly 205 is associated with the first truck 113a, and includes a first brake beam 216 and a second brake beam 218. Two of the brake shoes 206 are mounted near the respective ends of the first brake beam 216; another two of the brake shoes 206 are mounted near the respective ends of the second brake beam 218.

Each end of the first brake beam 216 is positioned in, and supported by a bracket (not shown) mounted a respective one of the side frames 120, proximate a forward end of the side frame 120. Each end of the second brake beam 218 likewise is positioned in, and supported by a bracket mounted on the respective one of the side frames 120, proximate a rearward end of the side frame 120. The forward and rearward directions are denoted in the figures as the "+x" and "−x" directions, respectively. The brackets are configured to restrain the first and second brake beams 216, 218 in the vertical ("z") and lateral ("y") directions, while allowing a limited degree of sliding movement in relation to the side frames 120 in the forward and rearward directions.

Figure 1:
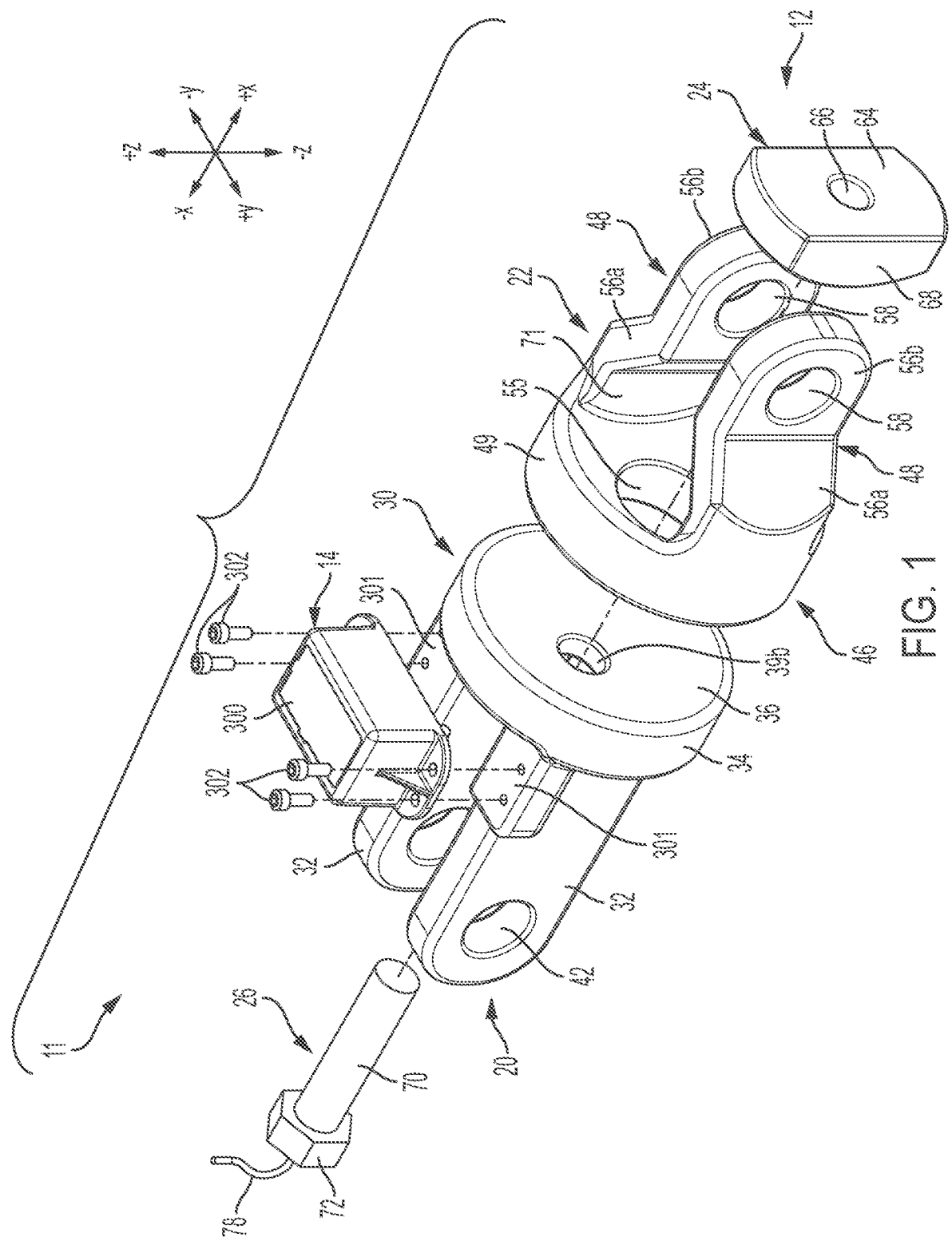
FIG. 1 is an exploded, top-front perspective view of a load measuring device of a brake monitoring system.

Directional terms such as forward, rearward, upper, lower, etc. are used with reference to the component orientations depicted in FIGS. 1, 13, and 14; these terms are used for illustrative purposes only, and unless otherwise expressly indicated are not intended to limit the scope of the appended claims.

Referring to FIG. 14, the first rigging subassembly 205 also includes a first truck lever 232; a second truck lever 234; a truck lever connection 236; and a top rod 238. A lower end of the first truck lever 232 is pivotally coupled to the first brake beam 216; an upper end of the first truck lever 232 is pivotally coupled to a forward end of the top rod 238. A forward end of the truck lever connection 236 is pivotally coupled to the first truck lever 232, at the approximate mid-point of the first truck lever 232.

A lower end of the second truck lever 234 is pivotally coupled to the second brake beam 218; and an upper end of the second truck lever 234 is pivotally coupled to a forward end of the coupling 12, as shown in FIG. 15. A rearward end of truck lever connection 236 is pivotally coupled to the second truck lever 234, at the approximate mid-point of the second truck lever 234.

A rearward end of the coupling 12 of the first force measuring device 11 is pivotally coupled at point 249 to a bracket 240, as shown in FIG. 15. The bracket 240 is secured to the underframe 111 of the railcar 102. The bracket 240 thus acts as an anchoring point for the rigging 204, i.e., the bracket 240 connects the articulating rigging 204 to the non-articulating underframe 111. Because the coupling 12 is connected directly to the bracket 240, at least a portion of the reactive force exerted by the underframe 111 in response to the braking force exerted on the wheels 103 of the first truck 113a by the rigging 204 and the brake shoes 126 is transmitted through the coupling 12. Thus, the coupling 12 is subject to a mechanical load that is indicative of, and proportional to the braking force applied to the wheels 103 of the first truck 113a.

Referring to FIGS. 13 and 14, the first rigging subassembly 205 also includes a brake lever 242. A first end of the brake lever 242 is pivotally coupled to a rearward end of the top rod 238. A second end of the brake lever 242 is pivotally coupled to a push rod 244 of the brake cylinder 200. The brake cylinder 200 is securely mounted on the underframe 111, and thereby acts as another anchoring point for the rigging 204. A forward end of the slack adjuster 202 is pivotally coupled to the brake lever 242, proximate a midpoint of the brake lever 242.

The rigging 204 also includes a center rod 250, a fulcrumed lever 252, and a second top rod 254. A forward end of the center rod 250 is pivotally coupled to a rearward end of the slack adjuster 202. A rearward end of the center rod 250 is pivotally coupled to the fulcrumed lever 252, at the approximate mid-point of the fulcrumed lever 252. A first end of the fulcrumed lever 252 is pivotally coupled to the underframe 111, and thus serves as an additional anchoring point for the rigging 204. A second end of the fulcrumed lever 252 is pivotally coupled to a forward end of the second top rod 254. The rearward end of the second top rod 254 is pivotally coupled to a first truck lever 232 of a second rigging subassembly 256.

The second rigging subassembly 256 is depicted in FIGS. 13 and 16. The second rigging subassembly 256 is substantially identical to the first rigging subassembly 205, and identical reference characters are used in the figures to refer to identical components of the first and second rigging subassemblies 205, 256. The second rigging subassembly 256, and the four brake shoes 206 associated therewith, apply braking force to the wheels 103 of the second truck 113b of the railcar 102. The coupling 12 of the second load measuring device 11 is associated with the second rigging subassembly 256, and is mounted between a second truck lever 234 of the second rigging subassembly 256; and another bracket 240 secured to a second location on the underframe 111. Thus, this coupling 12 is subject to a mechanical load that is indicative of, and proportional to the braking force applied to the wheels 103 of the second truck 113b. The second load measuring device 11 is substantially identical to the first load measuring device 11 which, as noted above, is described in detail below.

Referring to FIG. 16, the brake system 100 further includes a brake valve 258, and a dual-compartment air reservoir 260. The air reservoir 260 includes a service reservoir 262 and an emergency reservoir 264. The brake cylinder 200 is pneumatically actuated, and receives pressurized air from the brake valve 258. The brake valve 258 directs pressurized air from the air reservoir 260 to the brake cylinder 200. The pressured air, upon entering the brake cylinder 200, acts against a piston (not shown) within the brake cylinder 200, causing the piston to move forward against the bias of an internal spring (also not shown). The piston is connected to the push rod 244 of the brake cylinder 200, so that movement of the piston imparts a corresponding movement to the push rod 244.

The rigging 204 is actuated by the brake cylinder 200. In particular, the forward movement of the push rod 244 in response to the pressurization of the brake cylinder 200 causes the brake lever 242, which is pivotally coupled to the push rod 244, to rotate about the point at which the brake lever 242 is coupled to the slack adjuster 202. The rotation is in a clockwise direction, from the perspective of FIG. 16. The rotation of the brake lever 242 pulls the attached top rod 238 rearward (to the left in FIG. 16), which in turn causes the top of the first truck lever 232 to move rearward.

The rearward movement of the first truck lever 232 causes the first truck lever 232 to rotate in a counterclockwise direction from the perspective of FIG. 16, about the point at which the truck lever connection 236 is coupled to the first truck lever 232. The rearward movement of the first truck lever 232 also causes the truck lever connection 236 to move rearward, which in turn causes the second truck lever 234 to rotate in a clockwise direction, about the point at which the second truck lever 234 is coupled to the coupling 12. The rotation of the first and second truck levers 232, 234 causes the first and second beams 216, 218 to move forward and rearward, respectively, in relation to the side frames 120. The movement of the first and second beams 216, 218 urges the brake shoes 206 on each of the first and second beams 216, 218 into contact with their associated wheels 103, resulting in the application of a braking force to the wheels 103 of the first truck 113a.

The rotation of the brake lever 242 in response to movement of the push rod 244 also causes the slack adjuster 202 to move rearward, which imparts a corresponding rearward movement to the center rod 250. The rearward movement of the center rod 250, in turn, causes the fulcrumed lever 252 to rotate in a clockwise direction from the perspective of FIG. 16, about the point 251 at which the fulcrumed lever 252 is coupled to the underframe 111. The rotation of the fulcrumed lever 252 imparts a rearward movement to the second top rod 254, which in turn actuates the second rigging subassembly 256 in a manner substantially identical to the above-described actuation of the first rigging subassembly 205. The actuation of the second rigging subassembly 256 results in the application of a braking force to the wheels 103 of the second truck 113b.

The braking force applied by the first and second rigging subassemblies 205, 256 is removed by releasing the air pressure within the brake cylinder 200, which in turn causes the push rod 244 to move rearward under the bias of the internal spring of the brake cylinder 200. The rearward movement of the push rod 244 causes the various components of the first and second rigging subassemblies 205, 256 to articulate in a manner opposite to that described above in relation to the application of braking force, resulting in movement of the brake shoes 206 away from their associated wheels 103.

The brake system 100 also includes a manually operated hand brake 270, depicted in FIG. 16. The hand brake 270 includes a handle assembly mounted on the forward or rearward end of the box 112. The handle assembly includes a hand wheel 272, an axle (now shown), and gearing (also not shown) that mechanically couples the hand wheel 272 and the axle. The gearing provides a mechanical advantage that facilitates manual rotation of the hand wheel 272 by a single operator.

The hand brake 270 also includes a first chain 274 having a first end connected to the axle; a bell crank 280 connected to a second end of the first chain 274; and a second chain 282 having a first end connected to the bell crank 280, and a second end connected to the second end of the brake lever 242 (the second chain 282 is not depicted in FIG. 14, for clarity of illustration).

Rotation of the hand wheel 272 in a first direction imparts rotation to the axle, which in turn causes a portion of the first chain 274 to be wound around the axle, and the second end of the first chain 274 to move generally upward, from the perspective of FIG. 16. The upward movement of the first chain 274 rotates the bell crank 280. The rotation of the bell crank 280 causes the second chain 282 to move generally to the right, from the perspective of FIG. 16, which in turn causes the brake lever 242 to rotate in a clockwise direction. The clockwise rotation of the brake lever 242 results in actuation of the rigging 204 in the above-described manner, which in turn results in the application of braking force to the wheels 103. Subsequent rotation of the hand wheel 272 in a direction opposite the first direction causes the various components of the rigging 204 to return to their original positions in response to the bias of the internal spring of the brake cylinder 200, thereby removing the braking force from the wheels 103.

The brake valve 258 directs pressurized air to the brake cylinder 200 to actuate the rigging 204. The brake valve 258 facilitates charging, i.e., pressurization, of the air reservoir 260; the release of air pressure from the air reservoir 260; and maintenance of the air pressure within the air reservoir 260. Pressurized air is produced by a compressor (not shown) located in the locomotive 105. The pressurized air is directed from the compressor to the brake valve 258 by a brake pipe 290. The brake pipe 290 also services the other rail cars 102 in the train consist 104.

The brake valve 258 has a service portion 292 and an emergency portion 294. The engineer can apply normal braking force by moving a brake handle in the locomotive 105 to a "service" position. This results in a gradual, controlled reduction in the air pressure within the brake pipe 290. The service portion 292 of the brake valve 258, in response to this reduction in pressure, closes a valve 295 located in the airflow path between the brake valve 258 and the brake cylinder 200, and directs air from the service reservoir 262 into the brake cylinder 200. This causes the pressure within the brake cylinder 200 to increase, which in turn causes the piston and the attached push rod 244 to move forward. The forward movement of the push rod 244, as discussed above, causes the rigging 204 to articulate in a manner that results in the application of braking force to the wheels 103.

The air pressure in the service reservoir 262 decreases until the air pressure in the service reservoir 262 approximately equals that in the brake pipe 290. At this point, the service portion 292 of the brake valve 258 once again isolates the brake cylinder 200 from the brake pipe 290. Barring any significant leaks in the brake cylinder 200, the pressure within the brake cylinder 200 thereafter remains at a substantially constant level; and the brake shoes 206 remain in contact with their associated wheels 103, resulting in the continued application of braking force to the wheels 103.

The engine operator releases the braking force by moving the brake handle to a "release" position. This results in an increase in the pressure within the brake pipe 290, which in turn causes the service portion 292 of the brake valve 258 to open the valve 295. Opening the valve 295 causes the pressurized air within the brake cylinder 200 to be discharged to the atmosphere, which causes the piston and the attached push rod 244 to move rearward under the bias of the internal spring of brake cylinder 200. As discussed above, the rearward movement of the push rod 244 causes the rigging 204 to articulate in a manner that moves the brake shoes 206 away from their associated wheels 103, thereby removing the braking force on the wheels 103.

Also, the positive pressure differential between the brake pipe 290 and the service reservoir 262 causes the service portion 292 of the brake valve 258 to direct pressurized air from the brake pipe 290 to the service reservoir 262, causing the air pressure in the service reservoir 262 to increase. When the pressures in the brake pipe 290 and the service reservoir 262 equalize, the brake valve 258 interrupts the flow of pressurized air between the brake pipe 290 and the auxiliary reservoir 262, isolating the service reservoir 262 and sealing the pressurized air within the service reservoir 262. The service reservoir 262 at this point is ready to provide air the brake cylinder 200 when braking force is subsequently requested by the engine operator.

The emergency portion 294 of the brake valve 200 operates in a manner similar to the service portion 292, with the exception that the emergency portion 294 causes a faster and more forceful application of braking force. Emergency braking can be initiated manually by the train operator, by pulling an emergency braking handle, which causes an immediate discharge of the air pressure with the brake pipe 290; or automatically in the event of a significant leak in brake pipe 290 or other event that results in a rapid loss of air pressure within the brake pipe 290. The emergency portion 294 is configured to respond to a rapid drop in air pressure within the brake pipe 290 by closing the valve 295 and simultaneously directing air from both the emergency reservoir 264 and the service reservoir 262 to the brake cylinder 200, resulting in a rapid application of full braking force.

Figure 17:
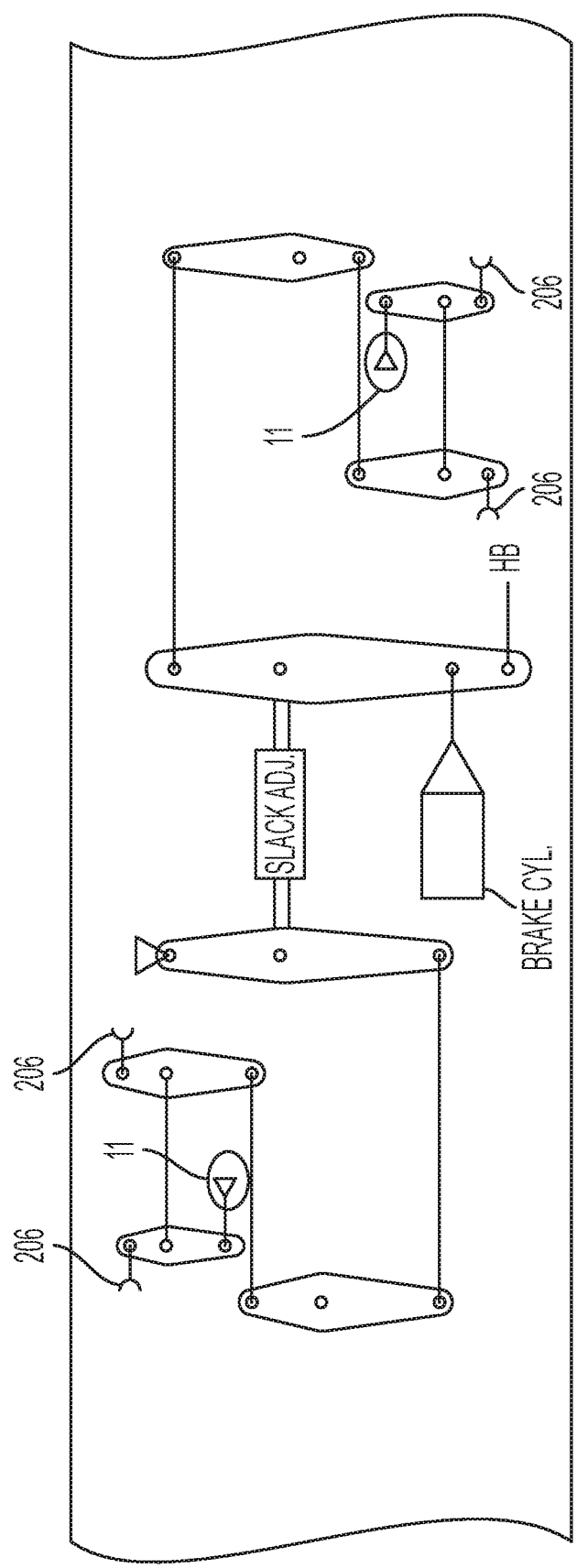
FIG. 17 is a schematic illustration of rigging of a brake system of a coal-carrying railcar.
Figure 18:
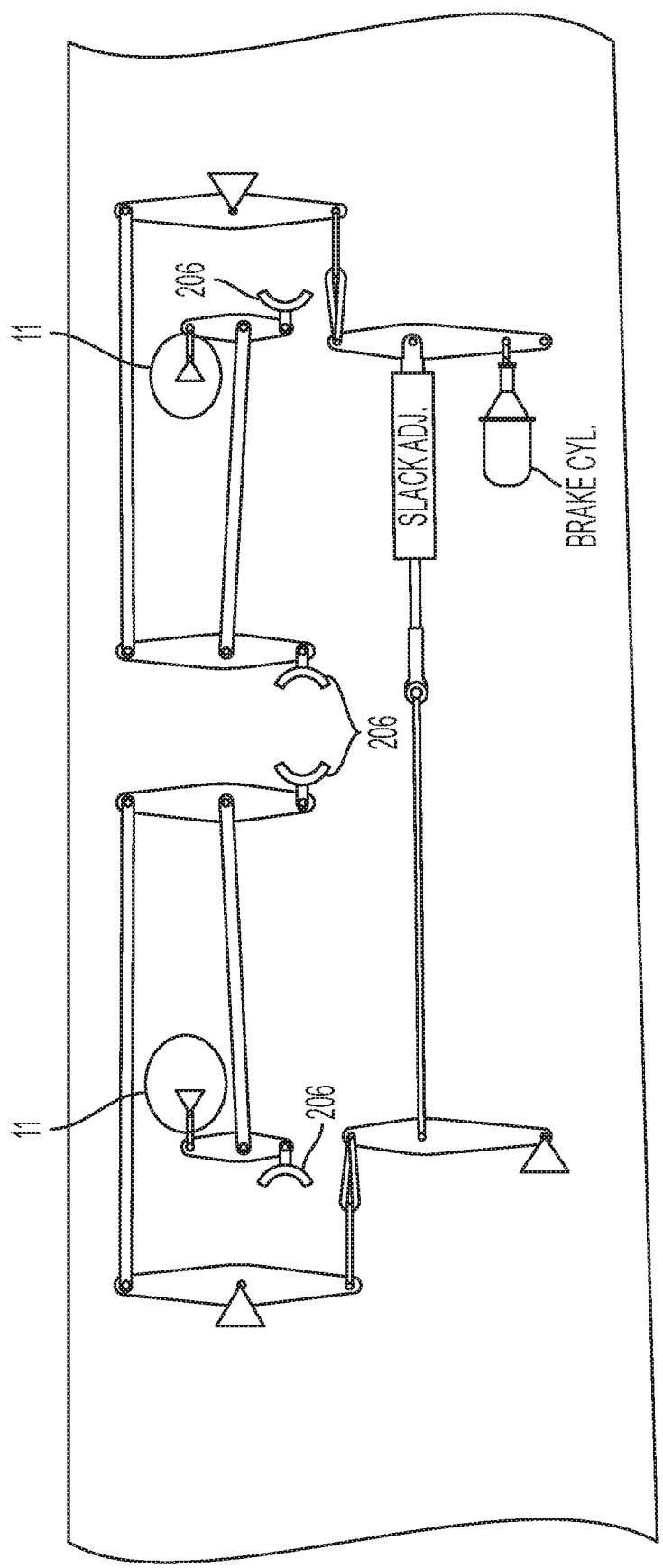
FIG. 18 is a schematic illustration of rigging of a brake system of a hopper railcar.

As noted above, the brake monitoring system can be used in railcars having other configurations, including railcars in the form of hopper cars; flatcars; gondolas; coal cars; tank cars; etc. For example, FIG. 17 is a schematic depiction of the brake rigging of a specific type of coal-carrying railcar, showing the relative locations of the load measuring devices 11. As another example, FIG. 18 is a schematic depiction of the brake rigging of a hopper railcar, showing the relative locations of the force measuring devices 11. In each of these particular applications, as in the railcar 102, the couplings 12 are located between, and interconnect the articulating rigging with a non-articulating underframe of the railcar.

Instrumented Coupling

Referring to FIGS. 1-9, the instrumented couplings 12 each include a rigid member in the form of a sensor jaw 20; another rigid member in the form of an articulating jaw 22; a spherical nut 24; and an instrumented bolt 26. The sensor jaw 20 can be pivotally coupled to an anchoring point of the rigging 204. In the illustrative example disclosed herein, the sensor jaw 20 is pivotally coupled to the bracket 240 mounted on the underframe 111 of the railcar 102 (see FIG. 15). The articulating jaw 22 can be pivotally coupled to a point on the rigging 204 through which an applied or reactive force passes when the rigging 204 is actuated by the brake cylinder 200. In the illustrative example disclosed herein, the articulating jaw 22 is pivotally coupled to the upper end of the second truck lever 234, as depicted in FIG. 15. The orientation of the coupling 12 can be reversed from that shown herein, i.e., the sensor jaw 20 can be pivotally coupled to the rigging 204, and the articulating jaw 22 can be pivotally coupled to the bracket 240.

The sensor jaw 20; articulating jaw 22; spherical nut 24; and instrumented bolt 26 can be formed from a suitable high-strength, durable, and weather-resistant material such as powder-coated carbon steel.

The instrumented bolt 26 and the spherical nut 24 secure the sensor jaw 20 to the articulating jaw 22. The coupling 12 is configured so that the articulating jaw 22 can pivot in relation to the sensor jaw 20 about three orthogonal axes, e.g., about the "x", "y," and "z" axes depicted in the figures. Also, the articulating jaw 22 can rotate about its longitudinal axis A2 in relation to the sensor jaw 20. The longitudinal axis of the articulating jaw 22 is denoted by the reference character "A2" in FIG. 6. Because the coupling 12 is positioned at an anchor point of the rigging 204 of the brake system 100, the instrumented bolt 26 is subjected to, and proportionally registers a force whenever the brake cylinder 200 actuates the rigging 204 to produce a braking force on the wheels 103.

The sensor jaw 20 includes a body 30, and two arms 32 that adjoin, and extend from the body 30. The body 30 has a substantially circular outer surface 34, and a concave forward-facing surface 36. The forward-facing (to the right in FIG. 1) surface 36 is visible in FIGS. 1 and 5.

Figure 5:
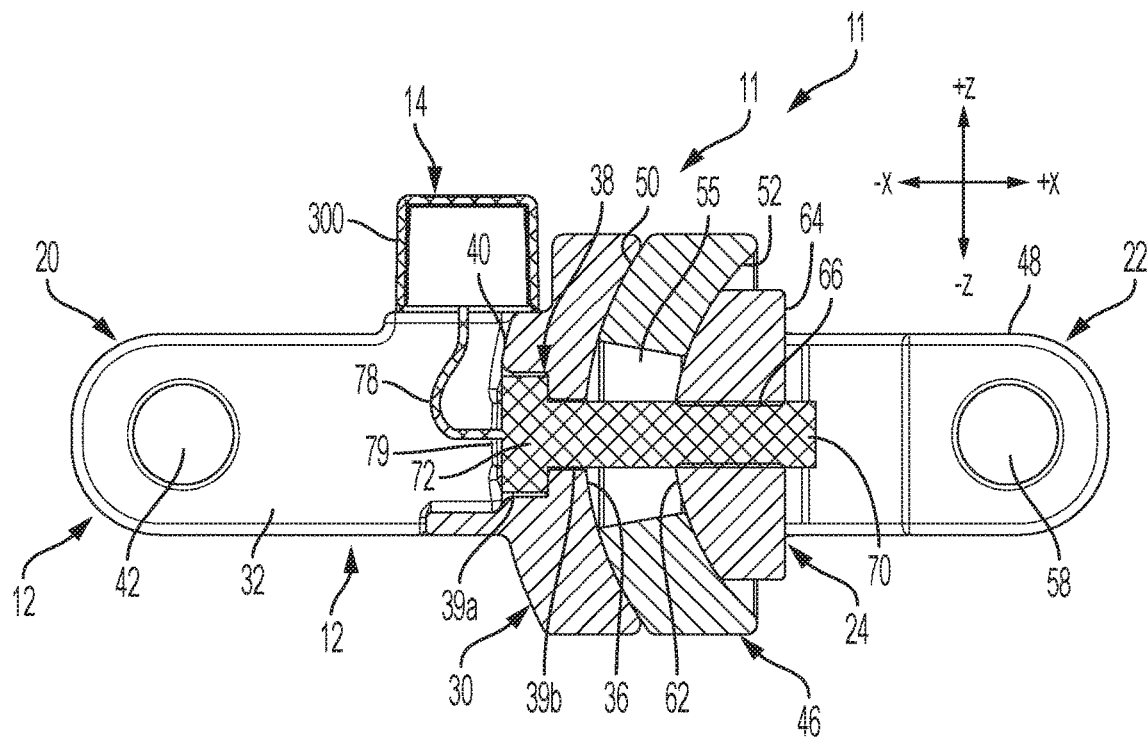
FIG. 5 is a cross-sectional view of the load measuring device shown in FIGS. 1-4, taken through the line "A-A" of FIG. 4.

The body 30 has a passage 38 formed therein, as can be seen in FIG. 5. The passage 38 extends along the longitudinal axis of the sensor jaw 20, between the forward-facing surface 36 and a rearward-facing surface 40 of the sensor jaw 20. The longitudinal axis of the sensor jaw 20 is denoted by the reference character "A1" in FIG. 6. The passage 38 has a first portion 39a, and an adjoining second portion 39b, as shown in FIG. 5. The diameter of the first portion 39a is greater than that of the second portion 39b.

Figure 4:
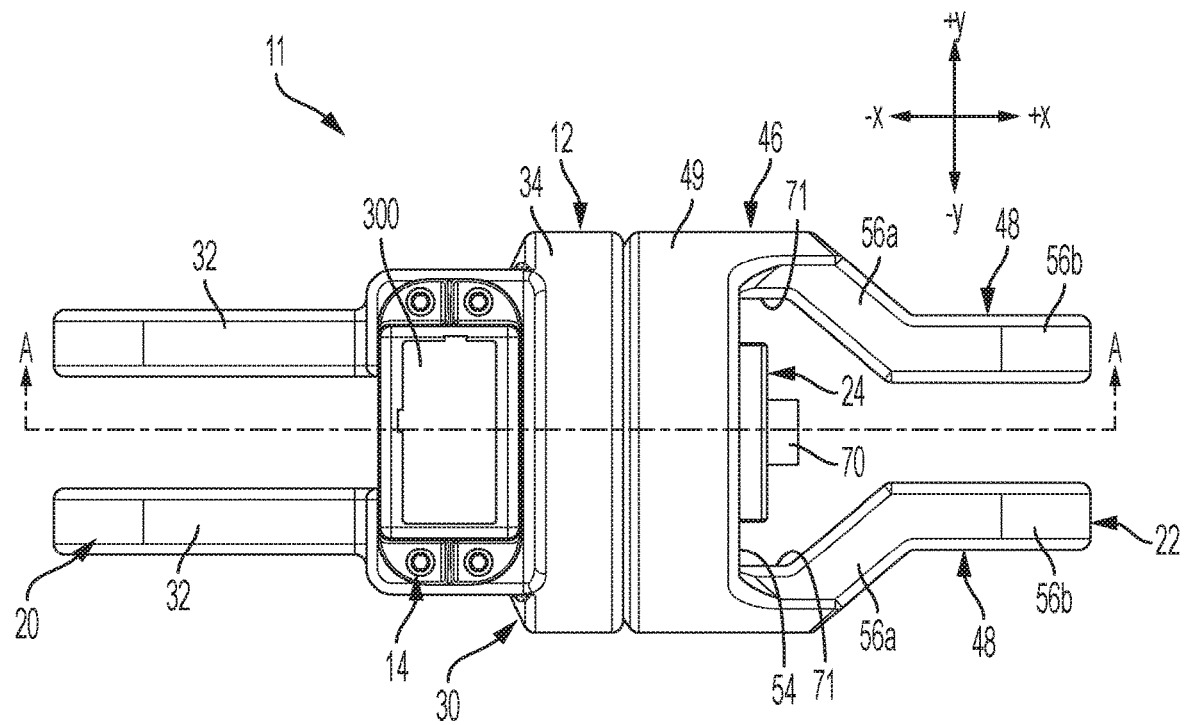
FIG. 4 is a top view of the load measuring device shown in FIGS. 1-3.

The arms 32 extend from the rearward-facing surface 40 of the body 30, in a direction substantially parallel to the longitudinal axis A1; and are symmetrically disposed about the longitudinal axis A1, as can be seen in FIG. 4. A rearward end of each arm 32 has a cylindrical bore 42 formed therein. The bores 42 align with each other when viewed from the side, i.e., from the perspective of FIG. 3.

The bores 42 are configured to align with corresponding bores in the bracket 240. The bores 42 and the bores in the bracket 240 receive a pin 241 that secures the sensor jaw 20 to the bracket 240, while permitting the sensor jaw 20 to rotate about an axis extending in the "y" direction. The pin 241 can be secured in position by cotter pins (not shown) or other suitable means.

Referring to FIGS. 1-8, the articulating jaw 22 includes a body 46, and two arms 48 that adjoin, and extend from the body 46. The body 46 has a substantially circular outer surface 49; a convex rearward-facing surface 50; and a concave forward-facing surface 52. The rearward-facing surface 50 is visible in FIGS. 5 and 6; the forward-facing surface 52 is visible in FIG. 5. The curvature of the rearward-facing surface 50 substantially matches that of the concave forward-facing surface 36 of the sensor jaw 20, so that the rearward-facing surface 50 can contact, and conform to the forward-facing surface 36 when the coupling 12 is assembled, as depicted in FIG. 5.

Referring to FIGS. 1 and 5, the body 46 has a passage 55 formed therein. The passage 55 is symmetrically disposed about the longitudinal axis A2 of the articulating jaw 22, between the rearward-facing surface 50 and the forward-facing surface 52 of the articulating jaw 22. The passage 55 is generally circular, and decreases in diameter as it extends from the rearward-facing surface 50 to the forward-facing surface 52.

The arms 48 extend from a forward end 54 of the body 46, and are symmetrically disposed about the longitudinal axis A2, as can be seen in FIG. 4. Each arm 48 has a first portion 56a that adjoins the forward end 54 of the body 46; and a second portion 56b that adjoins the first portion 56a. The first portions 56a extend from the forward end 54 inwardly, i.e., toward the longitudinal axis A2, and forwardly, as can be seen in FIG. 4. The second portions 56b extend substantially parallel to the longitudinal axis A2. Each second portion 56b has a cylindrical bore 58 formed therein. The bores 58 align with each other when viewed from the side, i.e., from the perspective of FIG. 3.

The bores 58 are configured to align with a corresponding bore in the second truck lever 234 of the first or second rigging subassemblies 205, 256. The bores 58 and the bore in the second truck lever 234 receive another pin 241 that secures the articulating jaw 22 to the second truck lever 234, while permitting the articulating jaw 22 to rotate about an axis extending in the "y" direction. The pin 241 can be secured in position by cotter pins or other suitable means.

The spherical nut 24 has a rearward-facing surface 62, visible in FIGS. 5 and 6. The rearward-facing surface 62 has a convex profile when viewed from the side, i.e., from the perspective of FIG. 5. The curvature of the rearward-facing surface 62 substantially matches that of the concave forward-facing surface 52 of the articulating jaw 22, so that the rearward-facing surface 62 can contact, and conform to the forward-facing surface 52 when the coupling 12 is assembled as depicted in FIG. 5.

Figure 2:
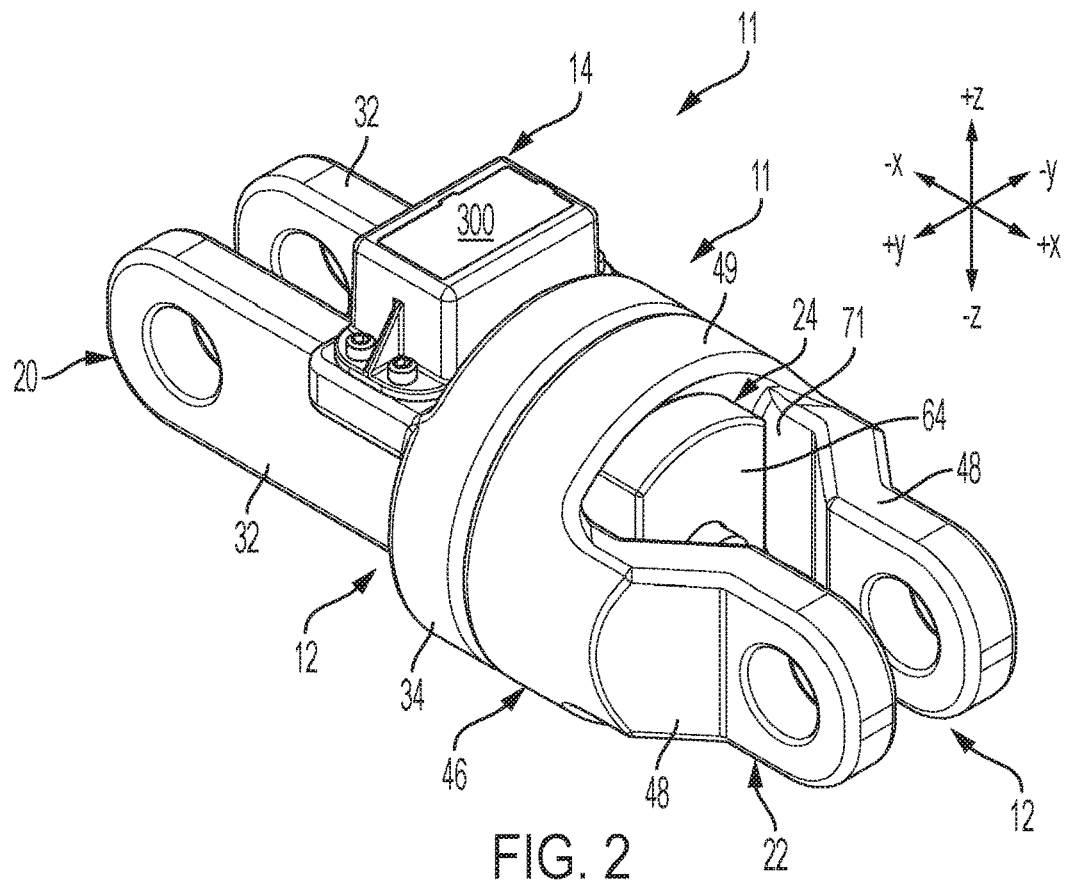
FIG. 2 is a top-front perspective view of the load measuring device shown in FIG. 1.
Figure 3:
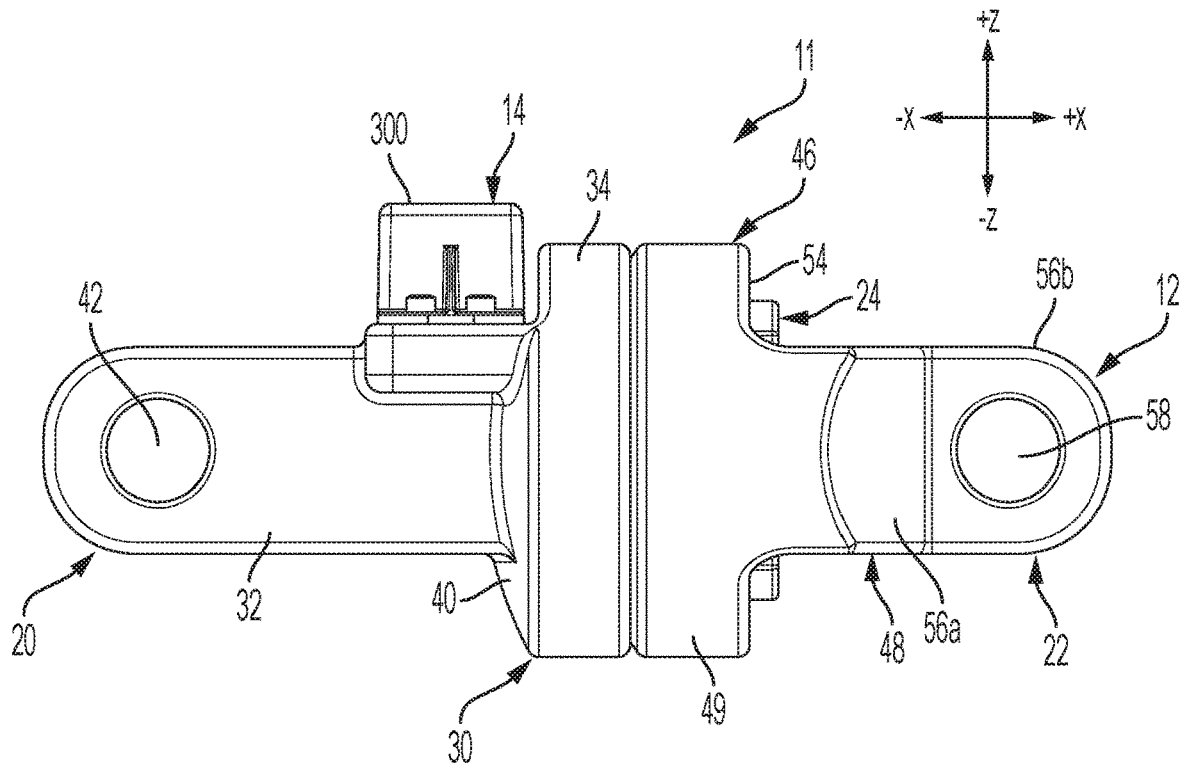
FIG. 3 is a side view of the load measuring device shown in FIGS. 1 and 2.

The spherical nut 24 also includes a substantially planar forward-facing surface 64, visible in FIGS. 1 and 2. A threaded cylindrical passage 66, visible in FIGS. 5 and 6, is formed in the spherical nut 24, and extends between the rearward-facing surface 62 and the forward facing surface 64. The spherical nut 24 further includes two substantially planar side surfaces 68, visible in FIGS. 1 and 6.

Instrumented Bolt

Figure 8:
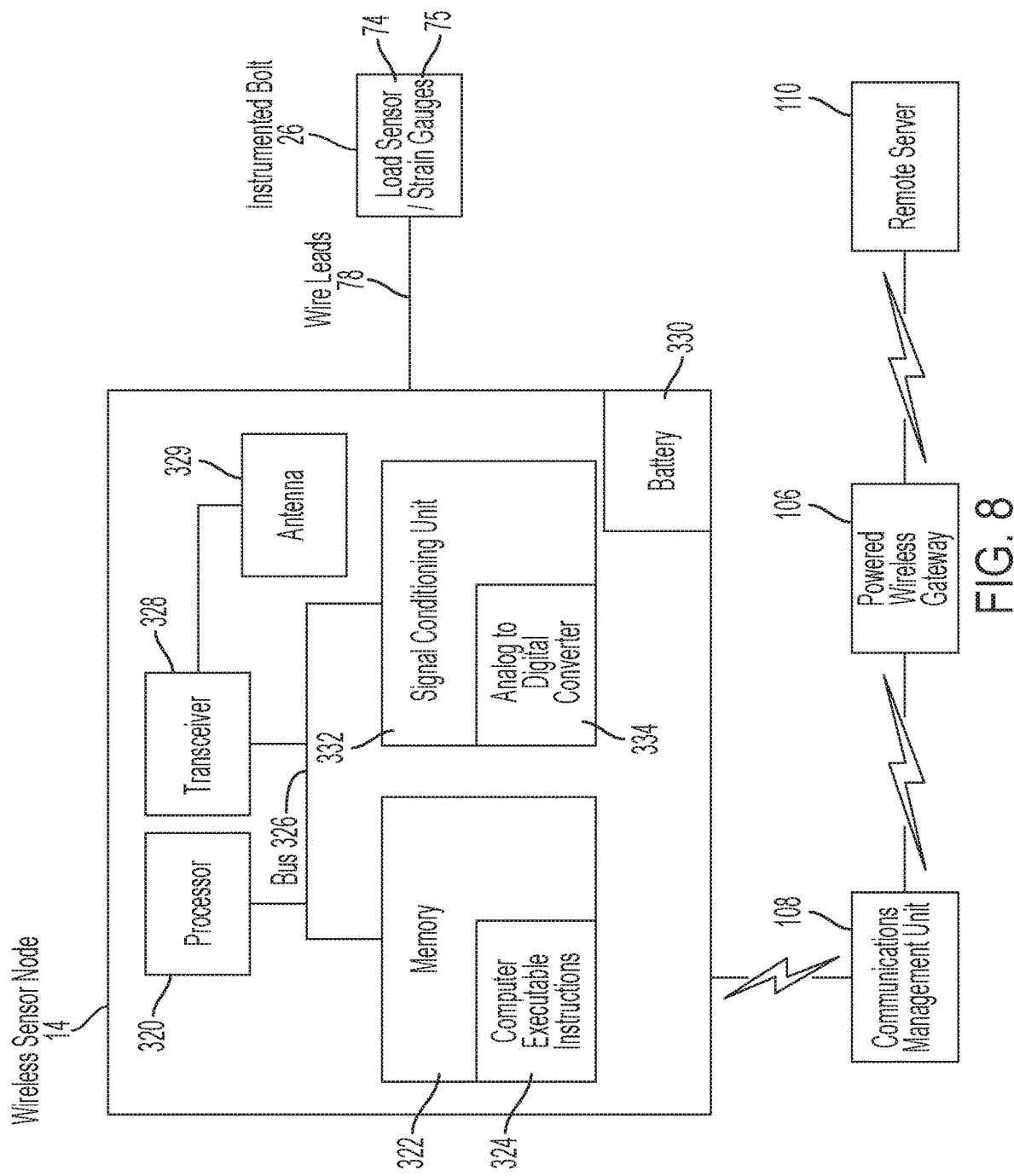
FIG. 8 is a diagrammatic illustration of various electrical components of the load measuring device shown in FIGS. 1-7.
Figure 9:
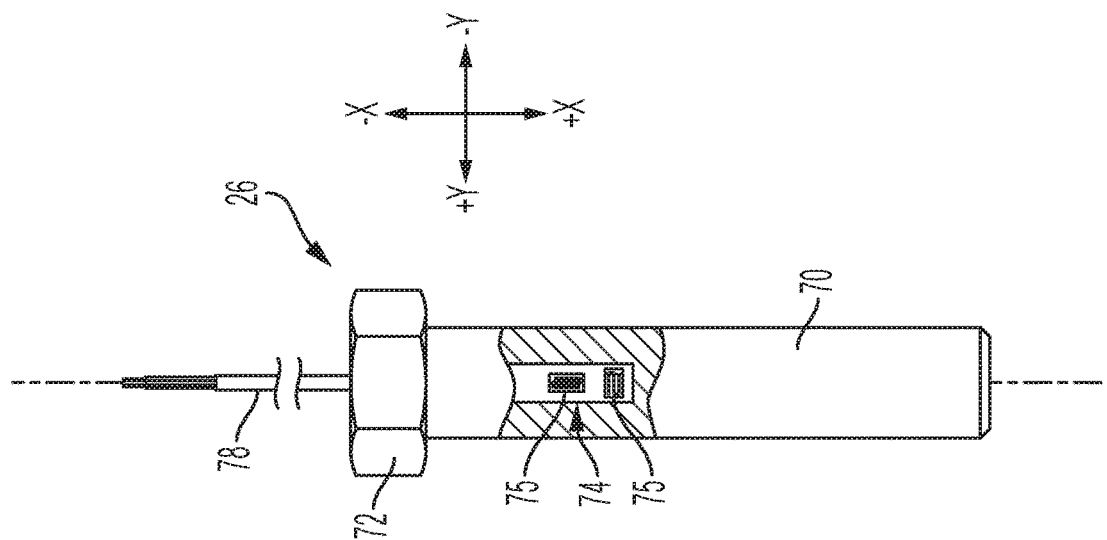
FIG. 9 is a side view of an instrumented bolt of the load measuring device shown in FIGS. 1-8, depicting a portion of the bolt in longitudinal cross section.

The instrumented bolt 26 includes a shank 70 and an adjoining head 72, as shown in FIG. 9. The load sensor 74, represented schematically in FIG. 8 and also illustrated in FIG. 9, is positioned on the shank 70. The load sensor 74, in conjunction with signal processing equipment located preferably within the WSN 14, is configured to measure axial, i.e., "x" direction, strain in the shank 70. The load sensor 74 can comprise, for example, two active metal-foil strain gauges 75 as depicted in FIG. 9. The strain gauges 75 are embedded in a bore formed within the shank 70, and are retained in the bore by an adhesive. The strain gauges 75 can be mechanically bonded to the exterior surface of the shank 70 in alternative embodiments.

One of the strain gauges 75 is oriented so that its sensing axis is substantially parallel to a longitudinal axis A3 of the shank 70. The other strain gauge 75 is oriented so that its sensing axis is substantially perpendicular to the longitudinal axis A3. The two strain gauges 75 together form a half-bridge sensor. Alternative embodiments can include more, or less than two strain gauges 75. For example, alternative embodiments can include a two pairs of perpendicular strain gauges 75 forming a full-bridge sensor; or a single strain gauge 75 forming a quarter-bridge sensor.

Wire leads 78 are connected to each of the strain gauges 75. The wire leads 78 are routed through the interior of the shank 70 and the head 72. The wire leads 78 electrically connect the strain gauges 75 and the WSN 14. The WSN 14 provides an excitation voltage to the strain gauges 75, and registers the response of the strain gauges 75 to axial strain in the shank 70. After the coupling 12 has been assembled, potting (not shown) can be applied to the location at which the wire leads 78 exit the head 72, as shown in FIG. 7, to provide strain relief and to otherwise protect the wire leads 78. The body 30 of the sensor jaw 20 has a raised lip 79 located at the entrance to the passage 38. The lip 79 can act as a dam to help contain the potting material.

The shank 70 has threads formed on a lower portion thereof, from the perspective of FIG. 9 (the threads are not shown in the figures). The threads on the shank 70 engage the threads in the threaded cylindrical passage 66 of the spherical nut 24. The instrumented bolt 26 is received in the passage 38 of the sensor jaw 20, and the passage 55 of the articulating jaw 22. As can be seen in FIG. 5, the first portion 39a of the passage 38 accommodates the relatively large-diameter head 72 of the instrumented bolt 26; and second portion 39b of the passage 38 accommodates the relatively narrow shank 70.

The instrumented bolt 26 and the spherical nut 24, when threadably engaged as depicted in FIG. 5, secure the articulating jaw 22 to the sensor jaw 20. The body 46 of the articulating jaw 22 has two opposing substantially planar surfaces 71, shown in FIGS. 1, 2, and 4. The spherical nut 24 is configured so that each of the side surfaces 68 of the spherical 24 is positioned adjacent to, and in close proximity to a corresponding one of the surfaces 71 of the spherical nut 24 when the spherical nut 24 and the instrumented bolt 26 are engaged. Interference between the adjacent surfaces 68, 71 prevents rotation of the spherical nut 24 in relation to articulating jaw 22, thereby helping to retain the spherical nut 24 on the instrumented bolt 26.

The head 72 of the instrumented bolt 26 can have a hexagonal outer perimeter. The perimeter of the first portion 39a of the passage 38 in the sensor jaw 20 can have a shape and dimensions that approximately match those of the outer perimeter of the head 72. Interference between the head 72 and the adjacent surfaces of the sensor jaw 20 prevents rotation of the head 72 in relation to the sensor jaw 20, thereby helping to retain the spherical nut 24 on the instrumented bolt 26.

The instrumented bolt 26 can be tightened onto the spherical nut 24 so as to produce a desired amount of pre-load on the instrumented bolt 26. The pre-load can be chosen so as to prevent the sensor jaw 20 and the articulating jaw 22 from loosening under the anticipated vibration and loading to which the load measuring device 11 will be subject during operation.

As noted above, each coupling 12 is attached to an anchoring point between the rigging 204 and the underframe 111 of the railcar 102, and thus is subject to a portion of the reactive force exerted by the underframe 111 on the rigging 204 when braking force is applied. Also, the articulating jaw 20 is connected to the second truck lever 234 of the rigging 204, and the sensor jaw 20 is connected to the underframe 111. Thus, the instrumented bolt 26, which secures the sensor jaw 20 to the articulating jaw 22, is subject to, and transmits a portion of reactive force; and this force component is quantified by the brake monitoring system based on the axial strain in the instrumented bolt 26 as measured by the load sensor 74. The measured force component, in turn, is used as a diagnostic indication that the brake system 100 of the individual railcar 102 is applying, or is capable of applying braking force of a certain magnitude.

As noted above, the configuration of the coupling 12 permits the articulating jaw 22 to pivot in relation to the sensor jaw 20 about three orthogonal axes; and to rotate about its axis A2 in relation to the sensor jaw 20. These movements are facilitated by the convex-concave interface between the rearward-facing surface 50 of the articulating jaw 22 and the forward-facing surface 36 of the sensor jaw 20; and by the convex-concave interface between the rearward-facing surface 62 of the spherical nut 24 and the forward-facing surface 52 of the articulating jaw 22.

The pivoting movement between the sensor jaw 20 and the articulating jaw 22 also is facilitated by the configuration of the passage 55 in the articulating jaw 22. As noted above, the diameter of the passage 55 decreases in diameter as it extends from the rearward-facing surface 50 to the forward-facing surface 52 of the articulating jaw 22. This feature gives the sides of the passage 55 an angled orientation in relation to the longitudinal axis A2 of the articulating jaw 22, as can be seen in FIG. 5. The angled sides of the passage 55 provide sufficient clearance to permit the shank 70 of the instrumented bolt 26 to assume an angled orientation in relation to the axis A2, which in turn facilitates pivoting movement of the articulating jaw 22 in relation to the sensor jaw 20.

Each coupling 12 thus facilitates measurement of the force being transmitted between the rigging 204 and one of its anchoring points to the underframe 111, while allowing the relative movement that necessarily occurs between the rigging 204 and the anchoring point. This feature helps to ensure that the sensing axis of the load sensor 74 remains aligned with the direction through which the force is being transmitted between the underframe 111 and the second truck levers 234 of the rigging 204 as the orientation of the second truck levers 234 change in relation to the underframe 111 during the application and release of braking force. The ability of the sensing axis of the load sensor 74 to remain aligned with the direction of force transmission can enhance the accuracy of the force measurement provided by the load sensor 74; and can help avoid premature failure of the instrumented coupling 12 due to non-axial loading the instrumented bolt 26.

Wireless Sensor Node

The specific configuration of each WSN 14 varies with respect to the number, and types of sensors with which the WSN 14 is equipped or otherwise associated. The sensing capabilities of the WSN's 14 installed on a particular railcar 102 are dependent upon the specific configuration of the brake monitoring system, which in turn is dependent, in part, on the diagnostic, alerting, and reporting requirements imposed on the system by the user in a particular application.

Each WSN 14 includes the electrical circuitry necessary for the operation of the WSN 14. The electrical circuitry includes the components and wiring needed to operate the particular sensors associated with the WSN 14, and/or to receive and process the output signals generated by the sensors. This circuitry can include, but is not limited to: analog and digital circuitry; CPUs; processors; circuit boards; memory; firmware; and controllers.

The circuitry of the WSN 14 can include a main board, which accommodates communications circuitry; antennae; a microprocessor; and a daughter board which includes circuitry to read the data from sensors. The main board, daughter board, and/or the sensors also can include a processor that executes firmware to provide intelligence sufficient to perform low-level analysis of the data; and can accept parameters from outside sources regarding when alarms should be raised.

Each WSN 14 also includes circuitry for short-range wireless communications; and a long-term power source such as a battery, an energy harvester, or internal power-generating capability. In the exemplary embodiments of the WSNs 14 disclosed herein, the power source is in the form of an industrial or robust battery 330. The circuitry also provides power conditioning and management functions, including features that conserve battery life by, for example, maintaining the WSN 14 in a standby state and periodically waking the WSN 14 to deliver readings from its sensors. The WSNs 14 optionally can be configured with off-train communication capabilities similar to those of the PWG 106, to allow the WSNs 14 to communicate with devices off of the train consist 104, such as a server located at a remote railroad operations center.

The WSN 14 provides the excitation voltage to the load sensor 74; registers the response of the load sensor 74 to the mechanical loading of the coupling 12; converts the response into an inferred force reading; and transmits the inferred force reading to the CMU 108 on the railcar 102, or other communication devices such as the PWG 106 on the locomotive 105; a PWG 106 in a railyard; or a remote server. For example, the CMU 108, in turn, transmits this information to the PWG 106 located on the locomotive 105. The WSN 14 is mounted on the arms 32 of the sensor jaw 20, and is secured to the arms 32 by fasteners or other suitable means.

The WSN 14 is depicted schematically in FIG. 8. The WSN 14 is configured to collect, process, and transmit data associated with the measurement of the braking force exerted by the brake system 100. While the WSN 14 as described herein is used exclusively in connection with the coupling 12, alternative embodiments of the WSN 14 can be configured to collect, process, and transmit multiple types of data obtained from multiple sensors mounted on the railcar 102. For example, alternative embodiments of the WSN 14 can be configured to collect, process, and transmit information such as ambient temperature; bearing temperature; vibrations; the location, speed, and acceleration of the railcar 102; the status of various subsystems on the railcar 102; etc.

The WSN 14 comprises a housing 300, shown in FIGS. 1-7. The housing 300 can be formed from a hard plastic resistant to environmental damage, such as a UV rated polymer and water, e.g., a polycarbonate/ABS blend. The housing 300 can be formed from other materials in the alternative. After the various components of the WSN 14 are installed within the housing 300, a potting material (not shown) can be injected into the housing 300 to maintain, encapsulate, and environmentally seal the components within. Any suitable electrical potting material capable of protecting the electric circuitry and components from the harsh weather, UV exposure, humidity, vibration, mechanical impact, thermal shocks and abrasion typically present in a railroad environment can be used. Such materials include epoxies, polyurethanes and silicone compounds. For example, a flexible urethane, suitable for electrical use and through which wireless signals of the frequencies to be used can be transmitted, can be used.

The WSN 14 can be mounted on the sensor jaw 20 by way of the housing 300. In particular, as shown in FIGS. 1 and 6, the housing 300 can be secured to pads 301 formed on the arms 32 of the sensor jaw 20, by fasteners 302 or other suitable means.

Referring to FIG. 8, the WSN 14 includes a processor 320; a memory 322 communicatively coupled to the processor 320; computer-executable instructions 324 stored on the memory 322; and a bus 326 through which the various electrical components of the WSN 14 communicate. The WSN 14 also includes a transceiver 328 communicatively coupled to the processor 320 and configured to facilitate wireless communications to, and from the CMU 108 via an antenna 329, using a suitable short-range wireless standard. The normal communication path to and from the WSN 14 is formed by its associated CMU 108, the PWG 106 located on the locomotive 105 or elsewhere, and a remote server. In alternative embodiments, the WSN 14 can communicate directly with the PWG 106 or the remote server. In such embodiments, the WSN 14 can be equipped with a suitable long-range communication capability. The processor 320, memory 322, bus 326, and transceiver 328 can be mounted on a printed circuit board (not shown) of the WSN 14.

The WSN 14 also includes a long-term power source, such as a battery in the form of an industrial or otherwise robust battery 330. Alternative embodiments can be equipped with other types of power sources in lieu of, or in addition to, the battery 330, such as an energy harvester, or internal power-generating capability. Other alternative embodiments can be configured by a power source external to the WSN 14, if such an external power source is available. The WSN 14 can be configured to provide power conditioning and management functions, and may include features to conserve battery life. For example, the processor 320 can remain in a power-conserving sleep mode until receiving an externally-generated command from the CMU 108 or the PWG 106; or until a brake-force measurement is to be obtained based on scheduled epochs or alerts, or upon excitation.

The WSN 14 also includes a signal conditioning unit 332 communicatively coupled to the load sensor 74 and the processor 320. The signal conditioning unit 332 comprises an analog to digital converter 334 that converts the analog output of the load sensor 74 into a digital input for the processor 320. The individual strain gauges 75 are electrically connected to the signal conditioning unit 332 such that the strain gauges 75 and the signal conditioning unit 332 form a Wheatstone bridge; with the strain gauges 75 forming the individual legs of the bridge; and the signal conditioning unit 332 powering the bridge and measuring the voltage differential across the bridge that results from strain in the shank 70. Calibration data can be stored in the memory 322, and can be used by the processor 320 to correlate the voltage imbalance across the Wheatstone bridge with the level of external axial force applied to the instrumented bolt 26, thereby calculating a measure of the braking force being applied by the brake system 100.

The WSN 14, through the computer-executable instructions 324, can be programmed to acquire, and to record and/or transmit brake-force measurements continuously; intermittently; on a pre-determined schedule; upon a predetermined type of event such as the application of braking force; and/or upon a command from an external source such as the locomotive 105 or a remote railroad operations center associated with a particular railway. For example, the WSN 14 can sample the strain gauges 75 intermittently to preserve power and increase battery life. In one possible application, the WSN 14 can power up every 30 seconds to read the strain gauges 75.

Multiple samples can be acquired from the strain gauges 75, and averaged. For example, 16 readings from each load cell 75 can be taken in immediate succession, and averaged. The WSN can be equipped a debouncing circuit (not shown) or other means for filtering out noise in the load cell signals.

The acquired brake-force measurements can be compared to predetermined baseline values stored in the memory 322, thereby providing a diagnostic indication of the condition of the brake system 100 of the railcar 102. The WSN 14 can be provided with logic to perform this comparison. Alternatively, the CMU 108 can be configured to perform the comparison. As another alternative, the comparison can be performed for all of the railcars 102 on the train consist 104 on a centralized basis by the PWG 106; or by a remote server 110 located at the remote railroad operations center or other location. A significant discrepancy between the actual and expected force values can be flagged as a maintenance item requiring attention; and in extreme cases can be interpreted as a malfunction requiring activation of an alert such as an alarm or warning signal, and resolution before the train consist 104 is allowed to depart or otherwise continue operating. Also, the WSN 14, PWG 106, and/or CMU 108 can be configured to determine whether the status of the brake system 100 needs to be transmitted immediately, or can be held for transmission at a later time.

Because the brake monitoring system can provide an indication of the magnitude of the braking force applied by the brake system 100 during normal operation of the railcar 102, the use of the brake monitoring system to conduct brake checks at predetermined intervals potentially can eliminate, or extend the interval between mandatory inspections, such as the Class 1A (1,000 mile inspection) brake test required under 49 CFR part 232, as revised at 66 FR 4193. The braking-force measurements provided by the brake monitoring system also can be used as an easily-obtainable, routine check of the brake system 100 at the dispatch point and/or destination of the train consist 104; on a daily or other periodic basis; or before particular events for which brake functionality is critical, such as entering a downgrade. Brake checks can be initiated manually by the engine operator; automatically based on logic in the WSN 14, CMU 108, or PWG 106; or upon commands issued from a remote location, such as the remote railroad operations center, and relayed to the train consist 104 via the PWG 106, CMU 108, or WSN 14.

The brake-force measurements can be analyzed to predict when brake service will be required for a particular railcar 102; to identify general trends in brake wear; to increase efficiency by planning routes and schedules that minimize the need for braking; and for other purposes. These analyses can be performed, for example, by the remote server 110 located at the remote railroad operations center. Alternatively, the WSU 14, CMU 108, or PWG 106 can be equipped with logic to perform the analyses.

The coupling 12 will respond to the braking force exerted by the rigging 204 regardless of whether the braking force is applied by the brake cylinder 200 or the hand brake 270. Thus, the brake monitoring system can provide a verification that the hand brake 270 of the railcar 102 is not applied. In particular, an inferred brake-force reading below a predetermined threshold, while the air brakes of the train consist 104 are not activated, can be interpreted as an indication that the hand brake 270 is not applied.

The system 100 can provide the "off" status of the handbrake 270 upon being queried by the engine operator or the remote railroad operations center; and/or automatically as part of the start-up and/or shut-down procedures for the locomotive 105. Also, an alert can be generated upon a determination that braking force above a predetermined threshold is being applied while the railcar 102 is in motion. Movement of the railcar 102 can be detected by instrumentation, such as an accelerometer, motion sensor, gyroscope, tilt sensor, GPS device, etc., positioned within the WSN 14, CMU 108, or PWG 106. The logic associated with determining the "off" status of the hand brake 270, and producing an alert if above-threshold braking force is detected during movement of the train consist 104 can reside in one or more of the WSN 14, CMU 108, and PWG 106.

In applications where the railcar 102 is equipped with a separate sensor to measure applied hand brake force, the system 100 can provide additional information about the status of the brake system 100. A suitable hand brake sensor is described, for example, in U.S. Pat. No. 9,734,565, the contents of which are incorporated by reference herein in their entirety. In such applications, the system 100 can be configured to provide, for example, an indication of whether the hand brake 270 has been applied over the airbrakes of the train consist 104. As another example, the system 100 in such applications can identify whether braking applied during movement of the train consist 104 was due to engagement of the hand brake 270, or application of the airbrakes.

The WSN 14 can be configured to communicate with the PWG 106 by way of the CMU 108. In applications where the railcar 102 is not equipped with a CMU 108, the WSN 14 can be configured to communicate directly with the PWG 106, or a remote server. Communication through a CMU 108 typically is implemented in applications where other WSNs 14 are installed on the railcar 102 to monitor operating parameters in addition to braking force. In such applications, each WSN 14 can be configured to form an ad-hoc network, for example a mesh network, with the other WSNs 14 on the same railcar 102, and with the CMU 108, as described in U.S. patent application Ser. No. 15/039,706 and U.S. Pat. No. 9,663,092, the contents of which are incorporated by reference herein in their entireties. The CMU 108 controls the railway-car-based network, which can be, for example, a wireless mesh network overlaid on the railcar 102 as depicted in FIG. 10. The CMU 108 is a single unit that serves as a communications link to other locations having remote receivers and the capability of processing the data received from the WSN 14, such as the PWG 106 on the locomotive 105 or the remote railroad operations center. The CMU 108 also communicates with, controls, and monitors the WSNs 14 in the local railway-car-based network.

The CMU 108 can include hardware such as a processor; a power source, e.g., a battery, solar cell, energy harvester, or internal power-generating capability; a global navigation satellite system (GNSS) device such as a global positioning system receiver; Wi-Fi, satellite, and/or cellular communication capability to communicate with the PWG 106 and/or a remotely-located server such as the remote server 110; other wireless communications capability for maintaining a railway-car-based network; and one or more sensors which may include, depending on the operational parameters to be monitored, an accelerometer, gyroscope, proximity sensor, temperature sensor, etc.

The PWG 106 is located on the locomotive 105. The PWG 106 can be positioned at other locations on the train consist 104 where a steady source of external power is available. The components and configuration of the PWG 106 are similar to those of the CMU 108, with the exception that the PWG 106 typically draws power from an external source, while the CMU 108 is self-powered. The PWG 106 can include a processor; a GNSS receiver; one or more sensors such as an accelerometer, gyroscope, proximity sensor, or temperature sensor; a satellite and or cellular communication system; a local wireless transceiver, e.g. WiFi; an Ethernet port; a high capacity mesh network manager and other means of communication. The PWG 106 may have power supplied by the locomotive 105 or other powered asset on which the PWG 106 is positioned; or may derive its power from another source, for example, from a solar power generator or from a high-capacity battery. The PWG 106 can control a train-based network, such as a mesh network, overlaid on the train consist 104 and comprising multiple CMUs 108 from the individual railcars 102 in the train consist 104, as depicted in FIG. 10. The PWG 106 also sends and receives communications to and from locations off of the train consist 104, such as the remote railroad operations center.

Alternative embodiments of the brake monitoring system can be used on a stand-alone basis, without the CMU 108 and the PWG 106. In such embodiments, the WSN 14 can be equipped with provisions to communicate with locations off of the train consist 104. To preserve internal battery power in such applications, the WSN 14 can be configured with a reduced duty cycle in which the WSN 14 searches for external transceivers, and does not sample and communicate until commanded to do so via a signal acquired from the external transceiver. The external transceiver can provide a communication link between the WSN 14, and an external device that generates the sampling command and receives the sampled data. The external device can be, for example, a laptop computer and a wireless manager device.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

We claim:

1. A load measuring device for use on a railway asset, the railway asset comprising an underframe, a plurality of wheels coupled to and configured to rotate in relation to the underframe, and a brake system comprising a rigging configured to apply a braking force to one or more of the wheels, the load measuring device comprising an instrumented coupling comprising:
    a first member configured to be connected to the rigging of the brake system;
    a second member configured to be connected to the underframe;
    a fastener configured to connect the first member to the second member, and to transmit a force between the first and second members; and
    a sensor attached to the fastener and configured to generate an output relating to the force transmitted between the first and second members;
    wherein the first member is configured to rotate in relation to the second member so that a sensing axis of the sensor remains substantially aligned with a direction in which an external force is applied to the load measuring device.

2. The load measuring device of claim 1, wherein the first member and the second member are rigid.

3. The load measuring device of claim 1, wherein the sensor comprises a strain sensor.

4. A load measuring device for use on a railway asset, the railway asset comprising an underframe, a plurality of wheels coupled to and configured to rotate in relation to the underframe, and a brake system comprising a rigging configured to apply a braking force to one or more of the wheels, the load measuring device comprising an instrumented coupling comprising:
    a first member configured to be connected to the rigging of the brake system;
    a second member configured to be connected to the underframe,
    a fastener configured to connect the first member to the second member, and to transmit a force between the first and second members; and
    a sensor attached to the fastener and configured to generate an output relating to the force transmitted between the first and second members;
    wherein the sensor comprises a strain sensor; and
    wherein the fastener comprises a bolt; and the strain sensor comprises a strain gauge fixed to the bolt.

5. The load measuring device of claim 1, wherein the first member is configured to rotate in relation to the second member about three orthogonal axes, one of the orthogonal axes being coincident with the sensing axis of the sensor.

6. The load measuring device of claim 1, further comprising a data collection unit mounted on one of the first and second members and communicatively coupled to the sensor.

7. The load measuring device of claim 6, wherein:
    the data collection unit comprises a sensor node;
    the sensor node comprises a processor; a memory communicatively coupled to the processor; and computer-executable instructions stored on the memory; and
    the computer-executable instructions, when executed by the processor, cause the processor to calculate the force transmitted between the first and second members based on the output of the sensor.

8. The load measuring device of claim 7, wherein the sensor node further comprises a transceiver communicatively coupled to the processor and configured to transmit a signal representative of the calculated force transmitted between the first and second members.

9. The load measuring device of claim 7, wherein the computer-executable instructions, when executed by the processor, cause the processor to store the calculated force transmitted between the first and second members.

10. The load measuring device of claim 7, wherein the computer-executable instructions, when executed by the processor, cause the processor to compare the calculated force transmitted between the first and second members to a predetermined baseline value for the calculated force transmitted between the first and second members.

11. The load measuring device of claim 7, wherein the computer-executable instructions, when executed by the processor, cause the processor to sample the output of the sensor node at predetermined intervals.

12. The load measuring device of claim 7, wherein the computer-executable instructions, when executed by the processor, cause the processor to infer the braking force based on the calculated force transmitted between the first and second members.

13. The load measuring device of claim 1, wherein:
    the force transmitted between the first and second members is proportional to the braking force; and
    the output of the sensor is proportional to the force transmitted between the first and second members.

14. A system for monitoring a brake system of a railway asset, comprising the load measuring device of claim 1.

15. The system of claim 14, wherein;
    the load measuring device further comprises a data collection unit mounted on one of the first and second members and communicatively coupled to the sensor;
    the data collection unit comprises a processor; a memory communicatively coupled to the processor; and computer-executable instructions stored on the memory; and
    the computer-executable instructions, when executed by the processor, cause the processor to calculate the force transmitted between the first and second members based on the output of the sensor.

16. The system of claim 15, wherein the data collection unit of the load measuring device is a first data collection unit, and the system further comprises a second data collection unit communicatively coupled to the sensor node and mounted on the railway asset.

17. The system of claim 16, wherein the second data collection unit comprises a communication management unit.

18. The system of claim 17, further comprising a powered wireless gateway communicatively coupled to the communication management unit.

19. The system of claim 16, further comprising a second load measuring device of claim 1 communicatively coupled to the second data collection unit.

20. The system of claim 19, wherein the second data collection unit is configured to consolidate data from the load measuring devices and/or to apply logic to the data to generate messages and warning alerts to a host.

21. The system of claim 16, wherein the first data collection unit comprises a transceiver communicatively coupled to the processor and configured to transmit the calculated force to the data collection unit.

22. A load measuring device for use on a railway asset, the railway asset comprising an underframe, a plurality of wheels coupled to and configured to rotate in relation to the underframe, and a brake system comprising a rigging configured to apply a braking force to one or more of the wheels, the load measuring device comprising an instrumented coupling comprising:
- a first member configured to be connected to the rigging of the brake system;
- a second member configured to be connected to the underframe;
- a fastener configured to connect the first member to the second member, and to transmit a force between the first and second members; and
- a sensor attached to the fastener and configured to generate an output relating to the force transmitted between the first and second members;

wherein:
the first member comprises a body, and two arms extending from the body and configured to be connected to the rigging of the brake system; and
the second member comprises a body, and two arms extending from the body of the second member and configured to be connected to the underframe.

23. The load measuring device of claim 22, wherein:
the body of the first member has a first passage formed therein;
the body of the second member has a second passage formed therein;
the fastener comprises a bolt; and
the first and second passages are configured to receive the bolt.

24. The load measuring device of claim 23, wherein:
one of the first and the second passages has a first end, and a second end having a diameter greater than a diameter of the first end;
the bolt comprises a head and an adjoining shank; and
the other of the first and second passages has a first portion configured to receive the head of the bolt, and a second portion having a diameter approximately equal to an outer diameter of a shank of the bolt.

25. The load measuring device of claim 24, wherein the first portion of the other of the first and second passages has a perimeter having a shape that approximately matches a shape the head of the bolt so that contact between the head of the bolt and the perimeter of the other of the first and second passages prevents rotation of the bolt.

26. The load measuring device of claim 25, wherein the head of the bolt has a substantially hexagonal shape.

27. The load measuring device of claim 23, wherein the body of the first or the second member comprises a raised lip adjacent to an entrance of the other of the first and second passages.

28. The load measuring device of claim 22, wherein:
the body of the first member comprises a rounded outer surface;
the body of the second member comprises a rounded outer surface having a curvature substantially matching a curvature of the rounded outer surface of the first member; and
the rounded outer surface of the first member is configured to slidably engage the rounded outer surface of the second member when the first member is connected to the second member.

29. The load measuring device of claim 28, wherein the rounded outer surfaces of the bodies of the first and second members are spherical segments.

30. The load measuring device of claim 29, wherein one of the rounded outer surfaces of the first and second members is rounded inwardly; and the other rounded outer surface of the first and second members is rounded outwardly.

31. The load measuring device of claim 22, wherein:
the fastener further comprises a nut having an outwardly-rounded outer surface;
the body of at least one of the first and the second members has an inwardly-rounded surface having a curvature substantially matching a curvature of the outwardly-rounded surface of the fastener; and
the outwardly-rounded outer surface of the nut is configured to slidably engage the inwardly-rounded outer surface of the first or the second member when the first member is connected to the second member.

32. The load measuring device of claim 31, wherein the outwardly-rounded outer surface of the nut and the inwardly-rounded outer surface of the body of the at least one of the first and second members are spherical segments.

33. The load measuring device of claim 32, wherein the nut further comprises a first and a second substantially planar side surface; and the body of the at least one of the first and second members further comprises a first and a second substantially planar surface configured to contact the respective first and second substantially planar surfaces of the nut to thereby prevent rotation of the nut in relation to the at least one of the first and the second members.

34. A railway asset, comprising: an underframe; a plurality of wheels coupled to and configured to rotate in relation to the underframe; a brake system comprising a rigging configured to apply a braking force to one or more of the wheels; a bracket mounted on the underframe and configured to provide an anchoring point for the rigging; and a load measuring device comprising an instrumented coupling, the instrumented coupling comprising:
- a first member connected to the rigging of the brake system;
- a second member connected to the bracket;
- a fastener configured to connect the first member to the second member, and to transmit between the first and second members a force reactive to the braking force; and
- a sensor attached to the fastener and configured to generate an output relating to the reactive force;
- wherein the first member is configured to rotate in relation to the second member so that a sensing axis of the sensor remains substantially aligned with a direction in which the reactive force is applied to the instrumented coupling.

35. The railway asset of claim 34, wherein the first member and the second member are rigid.

36. The railway asset of claim 34, wherein the sensor comprises a strain sensor.

37. The railway asset of claim 34, wherein the fastener comprises a bolt; and the sensor comprises a strain gauge fixed to the bolt.

38. The railway asset coupling of claim 34, wherein the first member and the second member are rigid.

39. The railway asset of claim 34, wherein the load measuring device further comprises a data collection unit mounted on one of the first and second members and communicatively coupled to the sensor.

40. The railway asset of claim 39, wherein:
the data collection unit comprises a sensor node;
the sensor node comprises a processor; a memory communicatively coupled to the processor; and computer-executable instructions stored on the memory; and
the computer-executable instructions, when executed by the processor, cause the processor to calculate the force transmitted between the first and second members based on the output of the sensor.

41. The railway asset of claim 40, wherein the sensor node further comprises a transceiver communicatively coupled to the processor and configured to transmit a signal representative of the calculated force transmitted between the first and second members.

42. The railway asset of claim 40, wherein the computer-executable instructions, when executed by the processor, cause the processor to store the calculated force transmitted between the first and second members.

43. The railway asset of claim 40, wherein the computer-executable instructions, when executed by the processor, cause the processor to compare the calculated force transmitted between the first and second members to a predetermined baseline value for the calculated force transmitted between the first and second members.

44. The railway asset of claim 40, wherein the computer-executable instructions, when executed by the processor, cause the processor to sample the output of the sensor at predetermined intervals.

45. A railway asset, comprising: an underframe; a plurality of wheels coupled to and configured to rotate in relation to the underframe; a brake system comprising a rigging configured to apply a braking force to one or more of the wheels; a bracket mounted on the underframe and configured to provide an anchoring point for the rigging; and a load measuring device comprising an instrumented coupling, the instrumented coupling comprising:
a first member connected to the rigging of the brake system;
a second member connected to the bracket;
a fastener configured to connect the first member to the second member, and to transmit between the first and second members a force reactive to the braking force; and
a sensor attached to the fastener and configured to generate an output relating to the reactive force;
wherein:
the first member comprises a body, and two arms extending from the body and connected to the rigging of the brake system; and
the second member comprises a body, and two arms extending from the body of the second member and connected to the bracket.

46. The railway asset of claim 45, wherein:
the body of the first member has a first passage formed therein;
the body of the second member has a second passage formed therein;
the fastener comprises a bolt; and
the first and second passages are configured to receive the bolt.

47. The railway asset of claim 46, wherein:
one of the first and the second passages has a first end, and a second end having a diameter greater than a diameter of the first end;
the bolt comprises a head and an adjoining shank; and
the other of the first and second passages has a first portion configured to receive the head of the bolt, and a second portion having a diameter approximately equal to an outer diameter of a shank of the bolt.

48. The railway asset of claim 47, wherein the first portion of the other of the first and second passages has a perimeter having a shape that approximately matches a shape the head of the bolt so that contact between the head of the bolt and the perimeter of the other of the first and second passages prevents rotation of the bolt.

49. The railway asset of claim 48, wherein the head of the bolt has a substantially hexagonal shape.

50. The railway asset of claim 46, wherein the body of the first or the second member comprises a raised lip adjacent to an entrance of the other of the first and second passages.

51. The railway asset of claim 45, wherein:
the body of the first member comprises a rounded outer surface;
the body of the second member comprises a rounded outer surface having a curvature substantially matching a curvature of the rounded outer surface of the first member; and
the rounded outer surface of the first member is configured to slidably engage the rounded outer surface of the second member when the first member is connected to the second member.

52. The railway asset of claim 51, wherein the rounded outer surfaces of the bodies of the first and second members are spherical segments.

53. The railway asset of claim 51, wherein one of the rounded outer surfaces of the first and second members is rounded inwardly; and the other rounded outer surface of the first and second members is rounded outwardly.

54. The railway asset of claim 45, wherein:
the fastener further comprises a nut having an outwardly-rounded outer surface;
the body of at least one of the first and the second members has an inwardly-rounded surface having a curvature substantially matching a curvature of the outwardly-rounded surface of the fastener; and
the outwardly-rounded outer surface of the nut is configured to slidably engage the inwardly-rounded outer surface of the first or the second member when the first member is connected to the second member.

55. The railway asset of claim 54, wherein the outwardly-rounded outer surface of the nut and the inwardly-rounded outer surface of the body of the at least one of the first and second members are spherical segments.

56. The railway asset of claim 54, wherein the nut further comprises a first and a second substantially planar side surface; and the body of the at least one of the first and second members further comprises a first and a second substantially planar surface configured to contact the respective first and second substantially planar surfaces of the nut to thereby prevent rotation of the nut in relation to the at least one of the first and the second members.

57. A method for determining the status of a brake system of a railway asset, the railway asset comprising an underframe, and a plurality of wheels coupled to and configured to rotate in relation to the underframe; the brake system comprising a rigging configured to apply a braking force to one or more of the wheels, the method comprising:

providing a load measuring device comprising an instrumented coupling and a data collection unit, the instrumented coupling comprising: a first member; a second member; a fastener configured to connect the first member to the second member, and to transmit a force between the first and second members; and a sensor mounted on the fastener, communicatively coupled to the data collection unit, and configured to generate an output relating to the force transmitted between the first and second members;

connecting the first member to the rigging of the brake system;

connecting the second member to an anchoring point for the rigging, the anchoring point being located on the underframe of the rail asset;

allowing the first member to rotate in relation to the second member so that a sensing axis of the sensor remains substantially aligned with a direction in which an external force is applied to the load measuring device; and based on an output of the sensor, determining a reactive force exerted on the device in response to the application of the braking force using the data collection unit.

58. The method of claim 57, further comprising comparing the reactive force to a predetermined baseline value for the reactive force using the data collection unit.

59. The method of claim 57, further comprising inferring a braking force exerted by the brake system from the reactive force using the data collection unit.

60. The method of claim 57, further comprising:

providing a second load measuring device;

connecting a first member of the second load measuring device to the rigging of the brake system;

connecting a second member of the second load measuring device to a second anchoring point for the rigging, the second anchoring point being located on the underframe of the railway asset; and based on an output of a sensor of the second load measuring device, determining a reactive force exerted on the second load measuring device in response to the application of the braking force.

61. A brake system for a railway asset, comprising:

a brake rigging configured to be mounted on, and to articulate in relation to an underframe of the railway asset;

a plurality of brake pads mounted on the brake rigging and each being configured to generate a braking force when contacting a respective wheel of the railway asset;

a brake cylinder coupled to the brake rigging and configured to move the brake rigging so that the brake rigging urges the brake pads into contact with the respective wheels;

a brake valve configured to provide pressurized air to the brake cylinder to actuate the brake cylinder; and a load measuring device comprising an instrumented coupling and a data collection unit, the instrumented coupling comprising: a first member configured to be connected to the brake rigging; a second member configured to be connected to the underframe; a fastener configured to connect the first member to the second member, and to transmit a force between the first and second members; and a sensor attached to the fastener, communicatively coupled to the data collection unit, and configured to generate an output relating to the force transmitted between the first and second members;

wherein the first member is configured to rotate in relation to the second member so that a sensing axis of the sensor remains substantially aligned with a direction in which an external force is applied to the load measuring device.

62. The brake system of claim 61, wherein:

the load measuring device is a first load measuring device;

the system further comprises a second load measuring device;

the first load measuring device is configured to be coupled to a first point on the brake rigging; and the second load measuring device is configured to be coupled to a second point on the brake rigging.

63. A railway asset, comprising: an underframe; a plurality of wheels coupled to and configured to rotate in relation to the underframe; a brake system comprising a rigging configured to apply a braking force to one or more of the wheels; a bracket mounted on the underframe and configured to provide an anchoring point for the rigging; and a load measuring device comprising an instrumented coupling, the instrumented coupling comprising:

a first member connected to the rigging of the brake system;

a second member connected to the bracket;

a fastener configured to connect the first member to the second member, and to transmit between the first and second members a force reactive to the braking force; and a sensor attached to the fastener and configured to generate an output relating to the reactive force:

wherein the sensor comprises a strain sensor; and wherein the fastener comprises a bolt; and the strain sensor comprises a strain gauge fixed to the bolt.

* * * * *